US011218702B2

(12) United States Patent
Zhang et al.

(10) Patent No.: US 11,218,702 B2
(45) Date of Patent: Jan. 4, 2022

(54) SIMPLIFIED CROSS COMPONENT PREDICTION

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/115,290

(22) Filed: Dec. 8, 2020

(65) Prior Publication Data

US 2021/0092395 A1 Mar. 25, 2021

Related U.S. Application Data

(63) Continuation of application No. PCT/IB2019/056967, filed on Aug. 19, 2019.

(30) Foreign Application Priority Data

Aug. 17, 2018 (WO) ................ PCT/CN2018/100965
Jan. 11, 2019 (WO) ................ PCT/CN2019/071382

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/117* (2014.11);
(Continued)

(58) Field of Classification Search
CPC .. H04N 19/176; H04N 19/186; H04N 19/105; H04N 19/593; H04N 19/117; H04N 19/157
See application file for complete search history.

(56) References Cited

U.S. PATENT DOCUMENTS 6,259,738 B1 * 7/2001 Yamaguchi ............... G06T 9/20
375/240.21
9,565,428 B2 2/2017 Guo et al.
(Continued)

FOREIGN PATENT DOCUMENTS

CN 110896478 A 3/2020
GB 2495942 A 5/2013
(Continued)

OTHER PUBLICATIONS

Misra et al. "Description of SDR and HDR Video Coding Technology Proposal by Sharp and Foxconn," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0026, 2018.

(Continued)

*Primary Examiner* — Daniel Chang
(74) *Attorney, Agent, or Firm* — Perkins Coie LLP

(57) ABSTRACT

A method for video coding includes receiving a bitstream representation of a current block of video data including at least one luma component and at least one chroma component, predicting, using a linear model, a first set of samples of the at least one chroma component based on a second set of samples that is selected by sub-sampling samples of the at least one luma component, and processing, based on the first and second sets of samples, the bitstream representation to generate the current block. In another representative aspect, the second set of samples are neighboring samples of the current block and are used for an intra prediction mode of the at least one luma component.

18 Claims, 23 Drawing Sheets

(51) Int. Cl.
  *H04N 19/117* (2014.01)
  *H04N 19/176* (2014.01)
  *H04N 19/186* (2014.01)
  *H04N 19/30* (2014.01)
  *H04N 19/80* (2014.01)
(52) U.S. Cl.
  CPC ......... *H04N 19/176* (2014.11); *H04N 19/186* (2014.11); *H04N 19/30* (2014.11); *H04N 19/80* (2014.11)

(56) References Cited

U.S. PATENT DOCUMENTS

| | | | |
|---|---|---|---|
| 10,045,023 B2* | 8/2018 | Pettersson | H04N 19/52 |
| 10,200,700 B2 | 2/2019 | Zhang et al. | |
| 10,419,757 B2 | 9/2019 | Chen et al. | |
| 10,469,847 B2 | 11/2019 | Xiu et al. | |
| 10,939,128 B2 | 3/2021 | Zhang et al. | |
| 10,979,717 B2 | 4/2021 | Zhang et al. | |
| 2012/0287995 A1* | 11/2012 | Budagavi | H04N 19/593 375/240.12 |
| 2012/0328013 A1* | 12/2012 | Budagavi | H04N 19/186 375/240.12 |
| 2013/0128966 A1* | 5/2013 | Gao | H04N 19/129 375/240.12 |
| 2013/0136174 A1* | 5/2013 | Xu | H04N 19/11 375/240.12 |
| 2013/0188703 A1* | 7/2013 | Liu | H04N 19/503 375/240.12 |
| 2013/0188705 A1* | 7/2013 | Liu | H04N 19/593 375/240.12 |
| 2014/0233650 A1* | 8/2014 | Zhang | H04N 19/14 375/240.16 |
| 2015/0036745 A1* | 2/2015 | Hsu | H04N 19/593 375/240.12 |
| 2015/0098510 A1* | 4/2015 | Ye | H04N 19/597 375/240.16 |
| 2015/0365684 A1* | 12/2015 | Chen | H04N 19/182 375/240.13 |
| 2016/0277762 A1* | 9/2016 | Zhang | H04N 19/593 |
| 2017/0150186 A1* | 5/2017 | Zhang | H04N 19/625 |
| 2017/0244975 A1* | 8/2017 | Huang | H04N 19/186 |
| 2017/0359595 A1* | 12/2017 | Zhang | H04N 19/593 |
| 2017/0366818 A1* | 12/2017 | Zhang | H04N 19/70 |
| 2018/0063527 A1* | 3/2018 | Chen | H04N 19/635 |
| 2018/0063531 A1* | 3/2018 | Hu | H04N 19/48 |
| 2018/0077426 A1* | 3/2018 | Zhang | H04N 19/117 |
| 2018/0131962 A1 | 5/2018 | Chen et al. | |
| 2018/0176594 A1* | 6/2018 | Zhang | H04N 19/11 |
| 2018/0205946 A1* | 7/2018 | Zhang | H04N 19/11 |
| 2018/0316918 A1* | 11/2018 | Drugeon | H04N 19/176 |
| 2019/0014316 A1* | 1/2019 | Panusopone | H04N 19/119 |
| 2019/0045184 A1 | 2/2019 | Zhang et al. | |
| 2019/0110045 A1* | 4/2019 | Zhao | H04N 19/105 |
| 2019/0166382 A1* | 5/2019 | He | H04N 19/186 |
| 2019/0306516 A1* | 10/2019 | Misra | H04N 19/11 |
| 2019/0342546 A1* | 11/2019 | Lin | H04N 19/105 |
| 2020/0068203 A1 | 2/2020 | Zhang et al. | |
| 2020/0120359 A1 | 4/2020 | Hanhart et al. | |
| 2020/0128272 A1* | 4/2020 | Jangwon | H04N 19/157 |
| 2020/0177878 A1* | 6/2020 | Choi | H04N 19/159 |
| 2020/0195930 A1* | 6/2020 | Choi | H04N 19/105 |
| 2020/0195970 A1* | 6/2020 | Ikai | H04N 19/186 |
| 2020/0195976 A1* | 6/2020 | Zhao | H04N 19/105 |
| 2020/0252619 A1 | 8/2020 | Zhang et al. | |
| 2020/0288135 A1* | 9/2020 | Laroche | H04N 19/132 |
| 2020/0296380 A1 | 9/2020 | Aono et al. | |
| 2020/0359051 A1 | 11/2020 | Zhang et al. | |
| 2020/0366896 A1 | 11/2020 | Zhang et al. | |
| 2020/0366910 A1 | 11/2020 | Zhang et al. | |
| 2020/0366933 A1 | 11/2020 | Zhang et al. | |
| 2020/0382769 A1 | 12/2020 | Zhang et al. | |
| 2020/0382800 A1 | 12/2020 | Zhang et al. | |
| 2020/0389650 A1 | 12/2020 | Laroche et al. | |
| 2020/0413049 A1 | 12/2020 | Biatek et al. | |
| 2021/0092396 A1 | 3/2021 | Zhang et al. | |

FOREIGN PATENT DOCUMENTS

| | | |
|---|---|---|
| WO | 2017139937 A1 | 8/2017 |
| WO | 2017214420 A1 | 12/2017 |
| WO | 2018053293 A1 | 3/2018 |

OTHER PUBLICATIONS

Ramasubramonian et al. CE3: Combined Test of CE3.2.1 and CE3.2.2 (Test 3.2.2.1), Joint Video Experts Team (JVET) of ITU-T SG 16 WP 3 and ISO/IEC JTC 1/SC 29/WG 11, 13th Meeting: Marrakech, MA, Jan. 9-18, 2019, document JVET-M0098, 2019.

International Search Report and Written Opinion from International Patent Application No. PCT/IB2019/056967 dated Feb. 4, 2020 (24 pages).

International Search Report and Written Opinion from International Patent Application No. PCT/CN2020/071659 dated Mar. 27, 2020 (12 pages).

Bross et al. "CE3: Multiple Reference Line Intra Prediction (Test 1.1.1, 1.1.2, 1.1.3 and 1.1.4)," Joint Video Experts Team (JVET) of ITU-T SG 16 WP 3 and ISO/IEC JTC 1/SC 29/WG 11, 12th Meeting, Macao, CN Oct. 3-12, 2018, document JVET-L0283, 2018.

Chen et al. "Chroma Intra Prediction by Reconstructed Luma Samples," Joint Collaborative Team on Video Coding (JCT-VC) of ITU-T SG 16 WP3 and ISO/IEC JTC1/SC29/WG11, 3rd Meeting, Guangzhou, CN, Oct. 7-15, 2010, JCTVC-C206, 2010.

Chen et al. "CE6.a: Chroma Intra Prediction by Reconstructed Luma Samples," Joint Collaborative Team on Video Coding (JCT-VC) of ITU-T SG 16 WP 3 and ISO/IEC JTC1/SC29/WG11, 4th Meeting: Daegu, KR, Jan. 20-28, 2011, document JCTVC-D350, 2011.

Chen et al. "Description of SDR, HDR and 360 degree Video Coding Technology Proposal by Huawei, GoPro, HiSilicon, and Samsung," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0025, 2018.

Choi et al. "CE3-Related: Reduced Number of Reference Samples for CCLM Parameter Calculation," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0138, 2018.

Flynn et al. Overview of the Range Extensions for the HEVC Standard: Tools, Profiles, and Performance, IEEE Transactions on Circuits and Systems for Video Technology, Institute of Electrical and Electronic Engineers, US, Jan. 2016, 26(1):4-19.

Ma et al. "CE3: Multi-directional LM (MDLM) (Test 5.4.1 and 5.4.2)" Joint Video Experts Team (JVET) of ITU-T SG 16 WP 3 and ISO/IEC JTC 1/SC 29/WG 11,12th Meeting: Macao, CN, Oct. 3-12, 2018, document JVET-L0338, 2018.

Van Der Auwera et al. "Description of Core Experiment 3: Intra Prediction and Mode Coding," Joint Video Experts Team (JVET) of ITU-T SG 16 WP 3 and ISO/IEC JTC 1/SC 29/WG 11, 10th Meeting, San Diego, USA, Apr. 10-20, 2018, document JVET-J1023, 2018.

Wang et al. "CE3-1.5: CCLM Derived with Four Neighbouring Samples," Joint Video Experts Team (JVET) of ITU-T SG 16 WP 3 and ISO/IEC JTC 1/SC 29/WG 11, 14th Meeting: Geneva, CH, Mar. 1-27, 2019, document JVET-N0271 2019.

Zhang et al. "New Modes for Chroma Intra Prediction," Joint Collaborative Team on Video Coding (JCT-VC) of ITU-T SG16 WP3 and ISO/IEC JTC1/SC29/WG11, 7th Meeting, Geneva, CH, Nov. 21-30, 2011, document JCTVC-G358, 2011.

Zhang et al. "Enhanced Cross-Component Linear Model Intra Prediction," Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-D0110, 2016.

(56) References Cited

OTHER PUBLICATIONS

Zhang et al. "CE3-Related: CCLM Prediction with Single-Line Neighbouring Luma Samples," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L329, 2018.
Zhang et al. "Enhanced Cross-Component Linear Model for Chroma Intra-Prediction in Video Coding," IEEE Transactions on Image Processing, Aug. 2018, 27(8):3983-3997.
International Search Report and Written Opinion from International Patent Application No. PCT/IB2019/057698 dated Feb. 4, 2020 (22 pages).
International Search Report and Written Opinion from International Patent Application No. PCT/IB2019/057699 dated Dec. 11, 2019 (17 pages).
International Search Report and Written Opinion from International Patent Application No. PCT/IB2019/057700 dated Dec. 11, 2019 (17 pages).
International Search Report and Written Opinion from International Patent Application No. PCT/CN2020/091830 dated Aug. 24, 2020 (10 pages).
Non-Final Office Action from U.S. Appl. No. 17/115,388 dated Feb. 9, 2021.
Notice of Allowance from U.S. Appl. No. 17/115,388 dated Sep. 28, 2021.

\* cited by examiner

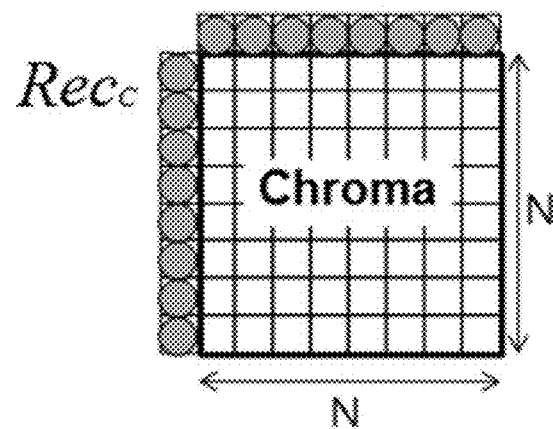
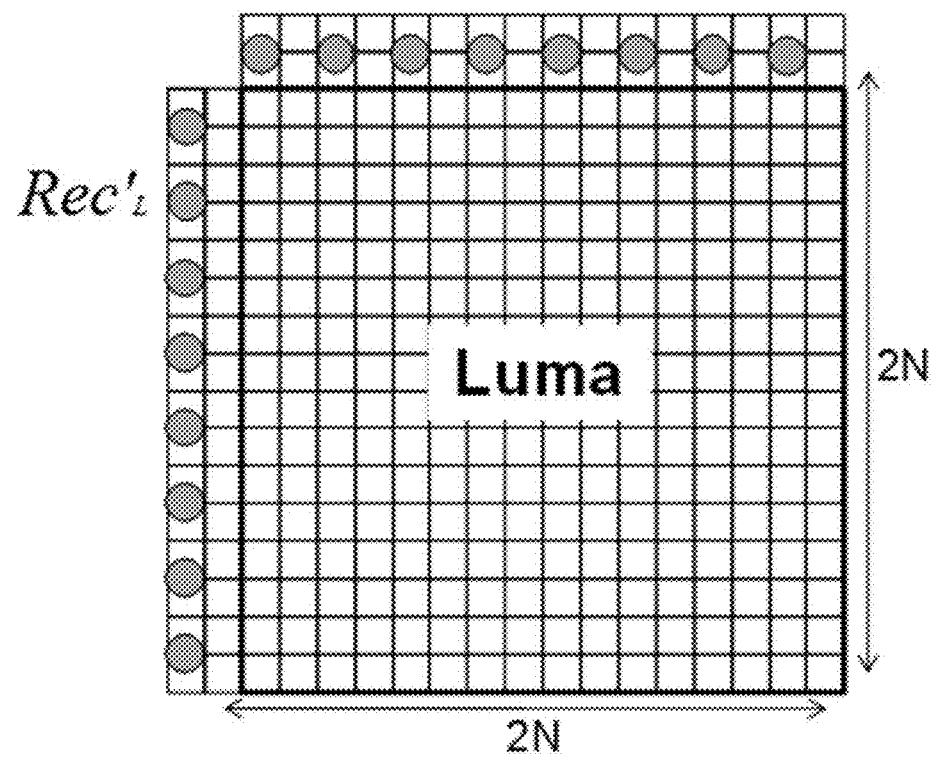
FIG. 1

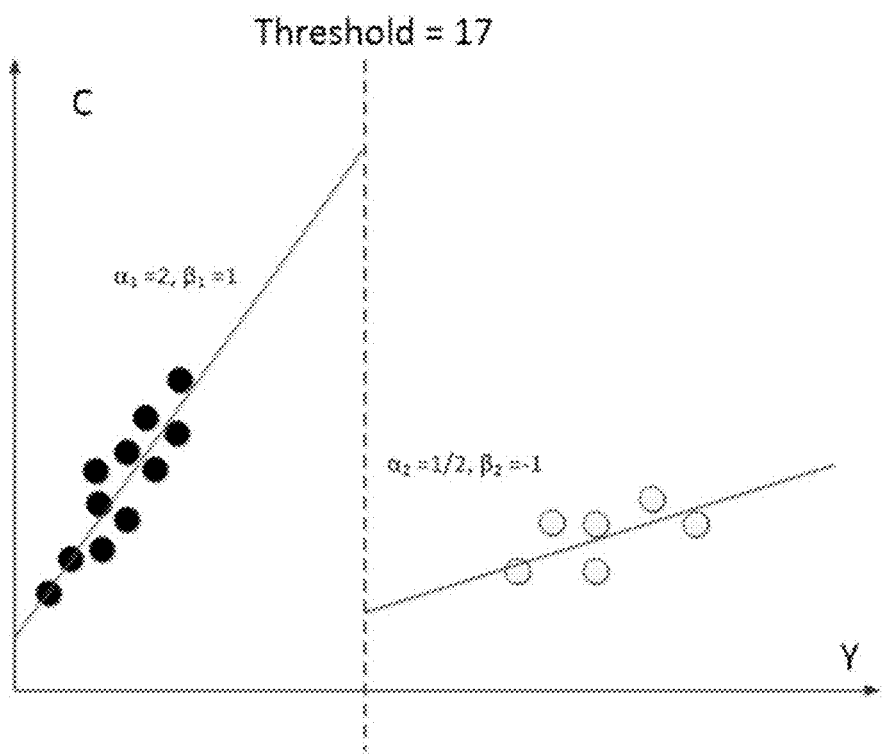
FIG. 2
 
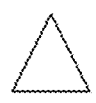
 
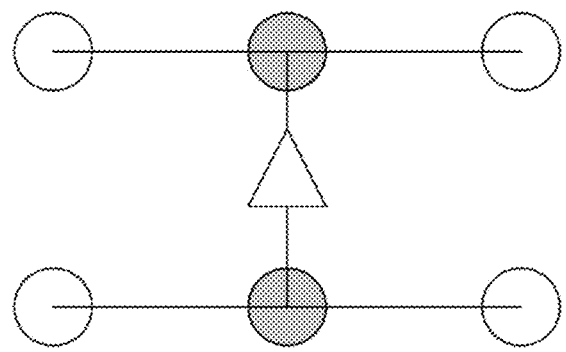
FIG. 3A                    FIG. 3B

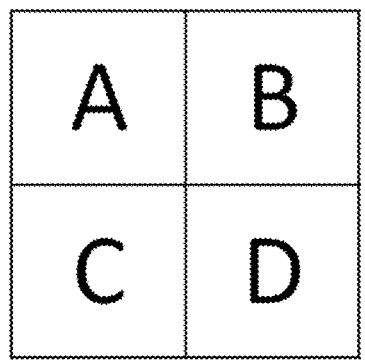
FIG. 4
FIG. 5A
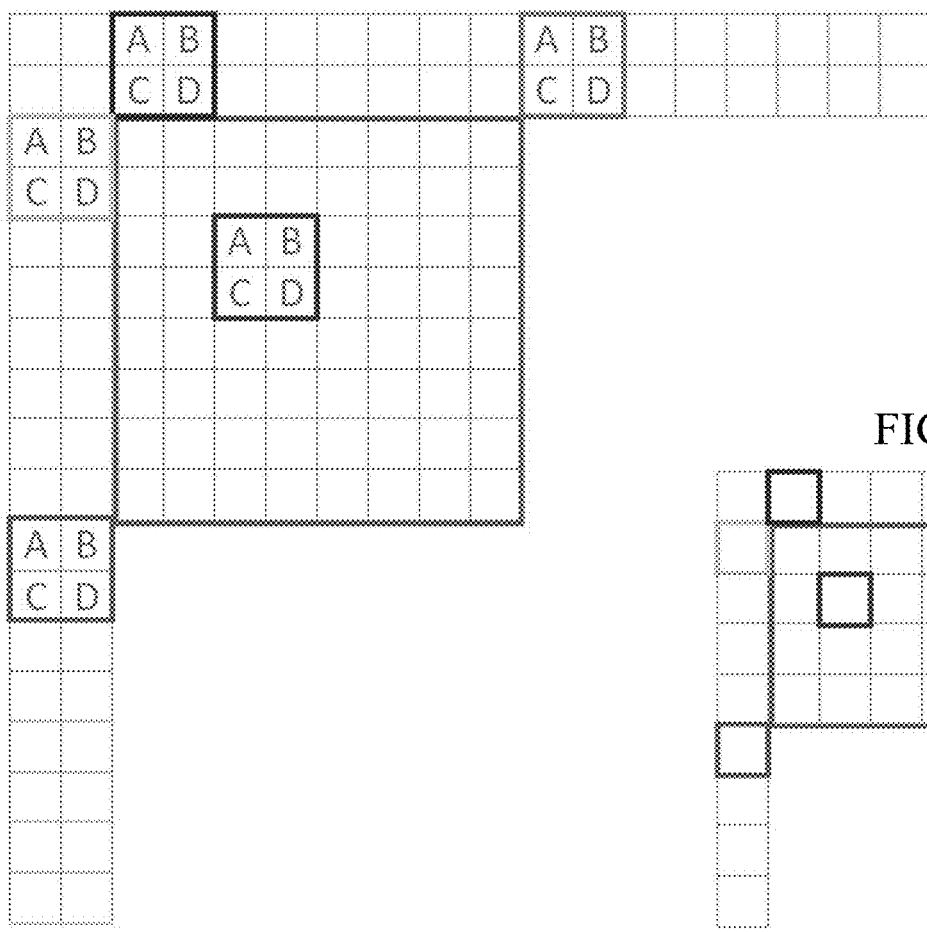
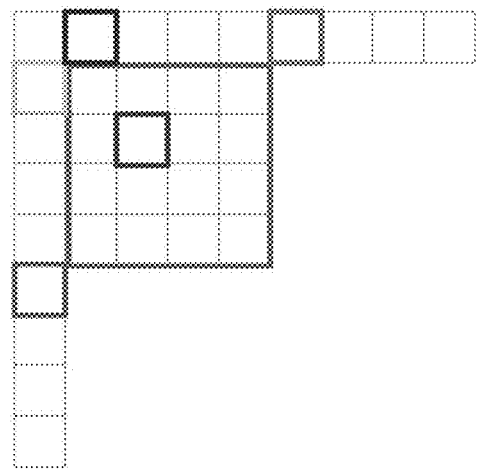
FIG. 5B

Left neighboring samples

Left-bottom/lower left neighboring samples

SIMPLIFIED CROSS COMPONENT PREDICTION

CROSS-REFERENCE TO RELATED APPLICATIONS

This application is a continuation of International Application No. PCT/IB2019/056967, filed on Aug. 19, 2019, which claims the priority to and benefits of International Patent Application No. PCT/CN2018/100965, filed on Aug. 17, 2018, PCT/CN2019/071382, filed on Jan. 11, 2019. All the aforementioned patent applications are hereby incorporated by reference in their entireties.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, low complexity implementations for the cross-component linear model (CCLM) prediction mode in video coding are described. The described methods may be applied to both the existing video coding standards (e.g., High Efficiency Video Coding (HEVC)) and future video coding standards (e.g., Versatile Video Coding (VVC)) or codecs.

In one example aspect, a method of video processing is disclosed. The method includes determining, using training samples of a luma block, a linear model used for predicting a first chroma block; and determining, using a set of samples of the luma block and the linear model, samples of the first chroma block; wherein the training samples or the set of samples are determined without using a multi-tap downsampling filter.

In another example aspect, another video processing method is disclosed. The method includes determining, using training samples of a luma block, a linear model used for predicting a first chroma block; and determining, using a set of samples of the luma block and the linear model, samples of the first chroma block; wherein the training luma samples are limited to luma samples neighboring the luma block that are at positions used for an intra prediction process.

In another example aspect, another video processing method is disclosed. The method includes determining, for a conversion between a current video block and a bitstream representation of the current video block, selectively based on a rule related to the current video block comprising a luma block and a first chroma block, a cross-component prediction scheme used for generating samples of the first chroma block from a set of samples of the luma block; and generating the samples of the first chroma block from the cross-component prediction scheme, wherein the cross-component prediction scheme is one of: a first cross-component prediction scheme that uses a linear model generated from training samples of the luma block such that the training samples and the set of samples are determined without using a multi-tap downsampling filter; or a second cross-component prediction scheme in which the training luma samples are limited to luma samples neighboring the current video block at positions used for an intra prediction process; wherein the rule specifies to select the cross-component prediction scheme depending on a video region to which the current video block belongs.

In another example aspect, another video processing method is disclosed. The method includes determining, for a conversion between a video block of a video and a coded representation of the video block, samples of a first chroma block of the video block from a luma block of the video block; wherein the samples of the first chroma block correspond to a weighted combination of a first intermediate chroma block and N second intermediate chroma blocks, wherein the first intermediate chroma block is generated from a first set of samples of the luma block using a first cross-component linear model, wherein the first cross-component linear model is generated using a first training sequence of luma samples; and wherein the N second intermediate chroma blocks are generated from N second sets of samples of the luma block using N second cross-component linear models, wherein the N second cross-component linear models are generated using N second training sequences of luma samples, where N is an integer.

In another example aspect, another video processing method is disclosed. The method includes downsampling a set of samples of a luma block using a downsampling process, wherein a downsampling filter used in the downsampling process depends on positions of luma samples being downsampled to generate a set of downsampled samples of the luma block; determining, from the set of downsampled samples of the luma block, samples of a first chroma block using a linear model.

In another representative aspect, the disclosed technology may be used to provide a method for simplified cross-component prediction. This method includes receiving a bitstream representation of a current block of video data comprising at least one luma component and at least one chroma component, predicting, using a linear model, a first set of samples of the at least one chroma component based on a second set of samples that is selected by sub-sampling samples of the at least one luma component, and processing, based on the first and second sets of samples, the bitstream representation to generate the current block.

In another representative aspect, the disclosed technology may be used to provide a method for simplified cross-component prediction. This method includes receiving a bitstream representation of a current block of video data comprising at least one luma component and at least one chroma component, predicting, using a linear model, a first set of samples of the at least one chroma component based on a second set of samples that are neighboring samples and are used for an intra prediction mode of the at least one luma component, and processing, based on the first and second sets of samples, the bitstream representation to generate the current block.

In yet another representative aspect, the disclosed technology may be used to provide a method for simplified cross-component prediction. This method includes receiving a bitstream representation of a picture segment comprising a plurality of blocks, wherein the plurality of blocks comprises a current block, and wherein each of the plurality of blocks comprises a chroma component and a luma component, performing a predicting step on each of the plurality of blocks, and processing, based on the respective first and second sets of samples, the bitstream representation to generate the respective block of the plurality of blocks.

In yet another representative aspect, the disclosed technology may be used to provide a method for simplified cross-component prediction. This method includes receiving a bitstream representation of a current block of video data comprising at least one luma component and at least one chroma component, performing, a predetermined number of times, a predicting step on the current block, generating a final first set of samples based on each of the predetermined number of first sets of samples, and processing, based on at least the final first set of samples, the bitstream representation to generate the current block.

In yet another representative aspect, the disclosed technology may be used to provide a method for simplified cross-component prediction. This method includes determining a dimension of a first video block; determining parameters regarding application of a cross-component linear model (CCLM) prediction mode based on the determination of the dimension of the first video block; and performing further processing of the first video block using the CCLM prediction mode in accordance with the parameters.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 1 shows an example of locations of samples used for the derivation of the weights of the linear model used for cross-component prediction.

FIG. 2 shows an example of classifying neighboring samples into two groups.

FIG. 3A shows an example of a chroma sample and its corresponding luma samples.

FIG. 3B shows an example of down filtering for the cross-component linear model (CCLM) in the Joint Exploration Model (JEM).

FIG. 4 shows an exemplary arrangement of the four luma samples corresponding to a single chroma sample.

FIGS. 5A and 5B shows an example of samples of a 4×4 chroma block with the neighboring samples, and the corresponding luma samples.

FIG. 19A demonstrates the case when w above neighboring samples and H left neighboring samples are involved. FIG. 19B demonstrates the case when 2 W above neighboring samples and 2H left neighboring samples are involved.

DETAILED DESCRIPTION

Figure 6A:
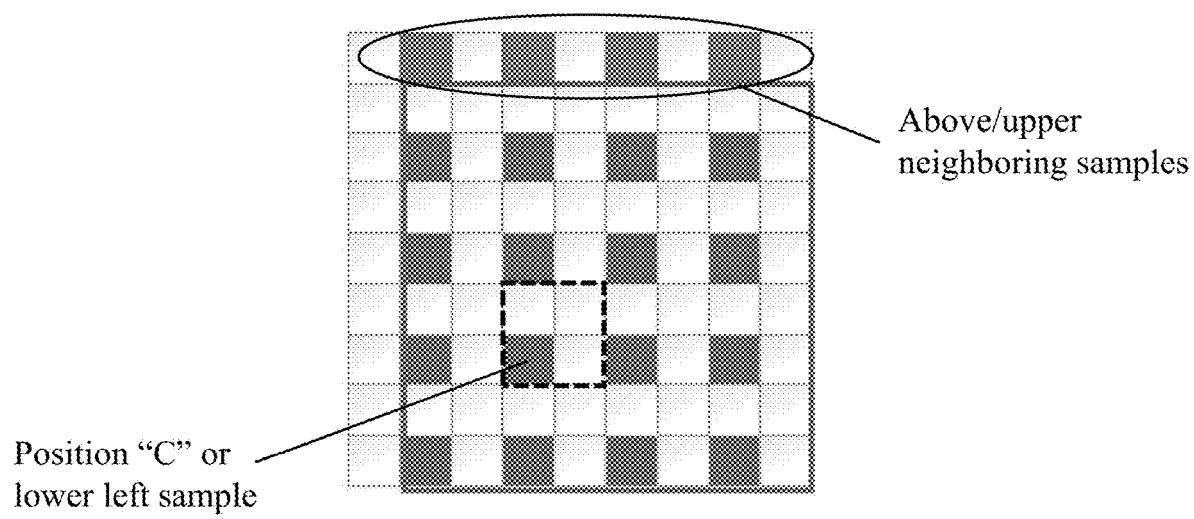
FIGS. 6A-6J show examples of CCLM without luma sample down filtering.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding (VVC) standard to be finalized, or other current and/or future video coding standards.

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

1 Embodiments of Cross-Component Prediction

Cross-component prediction is a form of the chroma-to-luma prediction approach that has a well-balanced trade-off between complexity and compression efficiency improvement.

1.1 Examples of the Cross-Component Linear Model (CCLM)

In some embodiments, and to reduce the cross-component redundancy, a cross-component linear model (CCLM) prediction mode (also referred to as LM), is used in the JEM, for which the chroma samples are predicted based on the reconstructed luma samples of the same CU by using a linear model as follows:

$$pred_C(i,j) = \alpha \cdot rec_L'(i,j) + \beta \quad (1)$$

Here, $pred_C(i,j)$ represents the predicted chroma samples in a CU and $rec_L'(i,j)$ represents the downsampled reconstructed luma samples of the same CU for color formats 4:2:0 or 4:2:2 while $rec_L'(i,j)$ represents the reconstructed luma samples of the same CU for color format 4:4:4. CCLM parameters α and are derived by minimizing the regression error between the neighboring reconstructed luma and chroma samples around the current block as follows:

$$\alpha = \frac{N \cdot \Sigma(L(n) \cdot C(n)) - \Sigma L(n) \cdot \Sigma C(n)}{N \cdot \Sigma(L(n) \cdot L(n)) - \Sigma L(n) \cdot \Sigma L(n)} \text{ and} \quad (2)$$

$$\beta = \frac{\Sigma C(n) - \alpha \cdot \Sigma L(n)}{N}. \quad (3)$$

Here, $L(n)$ represents the down-sampled (for color formats 4:2:0 or 4:2:2) or original (for color format 4:4:4) top and left neighboring reconstructed luma samples, $C(n)$ represents the top and left neighboring reconstructed chroma samples, and value of N is equal to twice of the minimum of width and height of the current chroma coding block.

In some embodiments, and for a coding block with a square shape, the above two equations are applied directly. In other embodiments, and for a non-square coding block, the neighboring samples of the longer boundary are first subsampled to have the same number of samples as for the shorter boundary. FIG. 1 shows the location of the left and above reconstructed samples and the sample of the current block involved in the CCLM mode.

In some embodiments, this regression error minimization computation is performed as part of the decoding process, not just as an encoder search operation, so no syntax is used to convey the α and β values.

In some embodiments, the CCLM prediction mode also includes prediction between the two chroma components, e.g., the Cr (red-difference) component is predicted from the Cb (blue-difference) component. Instead of using the reconstructed sample signal, the CCLM Cb-to-Cr prediction is applied in residual domain. This is implemented by adding a weighted reconstructed Cb residual to the original Cr intra prediction to form the final Cr prediction:

$$pred^*_{Cr}(i,j) = pred_{Cr}(i,j) + \alpha \cdot resi_{Cb}'(i,j) \quad (4)$$

Here, $resi_{Cb}'(i,j)$ presents the reconstructed Cb residue sample at position $(i,j)$.

In some embodiments, the scaling factor α may be derived in a similar way as in the CCLM luma-to-chroma prediction. The only difference is an addition of a regression cost relative to a default α value in the error function so that the derived scaling factor is biased towards a default value of −0.5 as follows:

$$\alpha = \frac{N \cdot \Sigma(Cb(n) \cdot Cr(n)) - \Sigma Cb(n) \cdot \Sigma Cr(n) + \lambda \cdot (-0.5)}{N \cdot \Sigma(Cb(n) \cdot Cb(n)) - \Sigma Cb(n) \cdot \Sigma Cb(n) + \lambda} \quad (5)$$

Here, $Cb(n)$ represents the neighboring reconstructed Cb samples, $Cr(n)$ represents the neighboring reconstructed Cr samples, and λ is equal to $\Sigma(Cb(n) \cdot Cb(n)) >> 9$.

In some embodiments, the CCLM luma-to-chroma prediction mode is added as one additional chroma intra prediction mode. At the encoder side, one more RD cost check for the chroma components is added for selecting the chroma intra prediction mode. When intra prediction modes other than the CCLM luma-to-chroma prediction mode is used for the chroma components of a CU, CCLM Cb-to-Cr prediction is used for Cr component prediction.

1.2 Examples of Multiple Model CCLM

In the JEM, there are two CCLM modes: the single model CCLM mode and the multiple model CCLM mode (MMLM). As indicated by the name, the single model CCLM mode employs one linear model for predicting the chroma samples from the luma samples for the whole CU, while in MMLM, there can be two models.

In MMLM, neighboring luma samples and neighboring chroma samples of the current block are classified into two groups, each group is used as a training set to derive a linear model (i.e., a particular α and β are derived for a particular group). Furthermore, the samples of the current luma block are also classified based on the same rule for the classification of neighboring luma samples.

FIG. 2 shows an example of classifying the neighboring samples into two groups. Threshold is calculated as the average value of the neighboring reconstructed luma samples. A neighboring sample with $Rec_L'[x,y] \leq$ Threshold is classified into group 1; while a neighboring sample with $Rec_L'[x,y] >$ Threshold is classified into group 2.

$$\begin{cases} Pred_c[x,y] = \alpha_1 \times Rec_L'[x,y] + \beta_1 & \text{if } Rec_L'[x,y] \leq \text{Threshold} \\ Pred_c[x,y] = \alpha_2 \times Rec_L'[x,y] + \beta_2 & \text{if } Rec_L'[x,y] > \text{Threshold} \end{cases} \quad (6)$$

1.3 Examples of Downsampling Filters in CCLM

In some embodiments, and to perform cross-component prediction, for the 4:2:0 chroma format, where 4 luma samples corresponds to 1 chroma samples, the reconstructed luma block needs to be downsampled to match the size of the chroma signal. The default downsampling filter used in CCLM mode is as follows:

$$Rec_L'[x,y] = \{2 \times Rec_L[2x,2y] + 2 \times Rec_L[2x,2y+1] + Rec_L[2x-1,2y] + Rec_L[2x+1,2y] + Rec_L[2x-1,2y+1] + Rec_L[2x+1,2y+1] + 4\} >> 3 \quad (7)$$

Here, the downsampling assumes the "type 0" phase relationship as shown in FIG. 3A for the positions of the chroma samples relative to the positions of the luma samples, e.g., collocated sampling horizontally and interstitial sampling vertically.

The exemplary 6-tap downsampling filter defined in (6) is used as the default filter for both the single model CCLM mode and the multiple model CCLM mode.

In some embodiments, and for the MMLM mode, the encoder can alternatively select one of four additional luma downsampling filters to be applied for prediction in a CU, and send a filter index to indicate which of these is used. The four selectable luma downsampling filters for the MMLM mode, as shown in FIG. 3B, are as follows:

$$Rec_L'[x,y] = (Rec_L[2x,2y] + Rec_L[2x+1,2y] + 1) >> 1 \quad (8)$$

$$Rec_L'[x,y] = (Rec_L[2x+1,2y] + Rec_L[2x+1,2y+1] + 1) >> 1 \quad (9)$$

$$Rec_L'[x,y] = (Rec_L[2x,2y+1] + Rec_L[2x+1,2y+1] + 1) >> 1 \quad (10)$$

$$Rec_L'[x,y] = (Rec_L[2x,2y] + Rec_L[2x,2y+1] + Rec_L[2x+1,2y] + Rec_L[2x+1,2y+1] + 2) >> 2 \quad (11)$$

Extension of Multiple Model CCLM in JVET-M0098

In JVET-M0098, MM-CCLM is extended. Two additional modes named CCLM-L and CCLM-T mode are added to the original MM-CCLM, named CCLM-TL. With CCLM-L, the linear parameters of the two models are derived only with the left neighboring samples. With the CCLM-T, the linear parameters of the two models are derived only with the top neighboring samples.

2 Examples of Drawbacks in Existing Implementations

The current CCLM implementations do not readily lend themselves to efficient hardware implementations, due to at least the following issues:

More neighboring luma samples than what are used in normal intra-prediction are required. CCLM requires two above neighboring rows of luma samples and three left neighboring columns of luma samples. MM-CCLM requires four above neighboring rows of luma samples and four left neighboring columns of luma samples.

Luma samples (for both neighboring luma samples used for parameter derivation and co-located luma reconstructed samples) need to be downsampled with a 6-tap filter which increases computational complexity.

3 Exemplary Methods for Simplified Cross-Component Prediction in Video Coding Embodiments of the presently disclosed technology overcome drawbacks of existing implementations, thereby providing video coding with higher coding efficiencies but lower computational complexity. Simplified cross-component prediction, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

The proposed simplified CCLM methods include, but are not limited to:

Only requiring neighboring luma samples used in normal intra-prediction; and

Not needing to downsample the luma samples, or downsampling is performed by a simple two-sample averaging.

The examples described below assume that the color format is 4:2:0. As shown in FIG. 3A, one chroma (Cb or Cr) sample (represented by a triangle) corresponds to four luma (Y) samples (represented by circles): A, B, C and D as shown in FIG. 4. FIG. 5 shows an example of samples of a 4×4 chroma block with neighboring samples, and the corresponding luma samples.

Example 1. In one example, it is proposed that CCLM is done without down-sampling filtering on luma samples.

(a) In one example, down-sampling process of neighboring luma samples is removed in the CCLM parameter (e.g., α and β) derivation process. Instead, the down-sampling process is replaced by sub-sampling process wherein non-consecutive luma samples are utilized.

(b) In one example, down-sampling process of samples in the co-located luma block is removed in the CCLM chroma prediction process. Instead, only partial luma samples in the co-located luma block is used to derive the prediction block of chroma samples.

(c) FIGS. 6A-6J show examples on an 8×8 luma block corresponding to a 4×4 chroma block.

(d) In one example as shown in FIG. 6A, Luma sample at position "C" in FIG. 4 is used to correspond to the chroma sample. The above neighboring samples are used in the training process to derive the linear model.

Figure 6B:
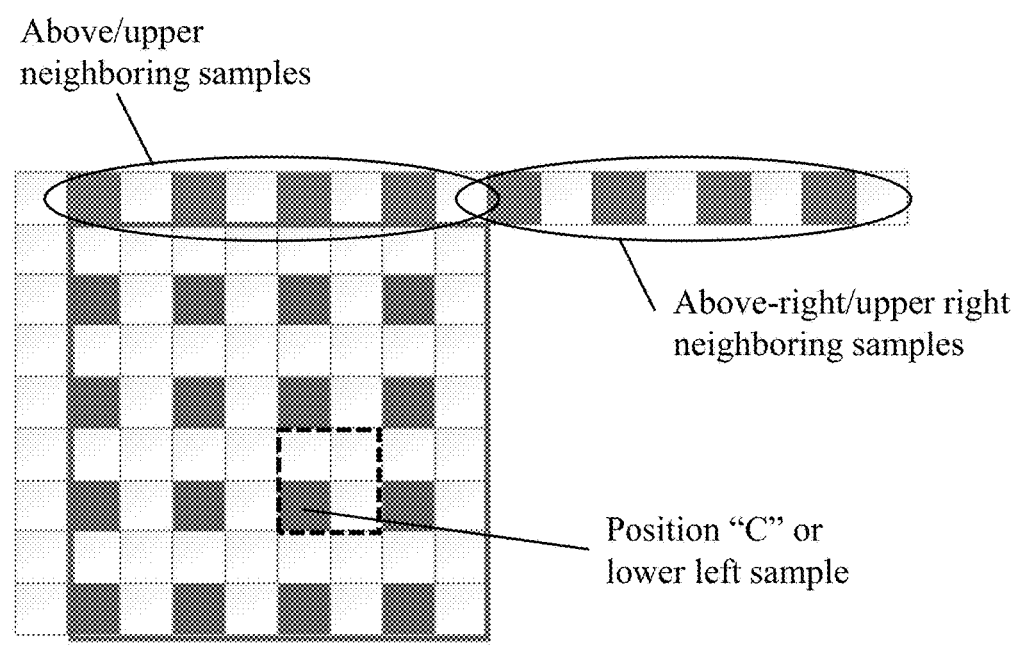

(e) In one example as shown in FIG. 6B, luma sample at position "C" in FIG. 4 is used to correspond to the chroma sample. The above neighboring samples and above-right neighboring samples are used in the training process to derive the linear model.

Figure 6C:
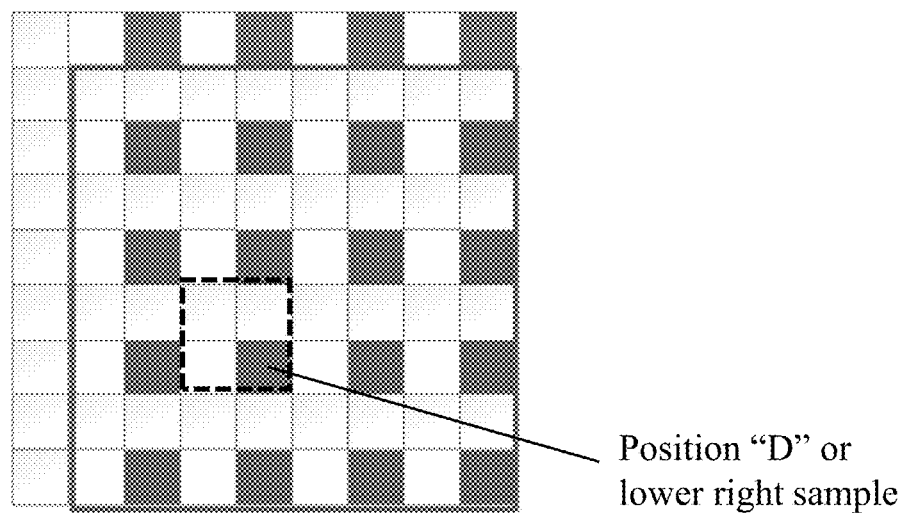

(f) In one example as shown in FIG. 6C, luma sample at position "D" in FIG. 4 is used to correspond to the chroma sample. The above neighboring samples are used in the training process to derive the linear model.

Figure 6D:
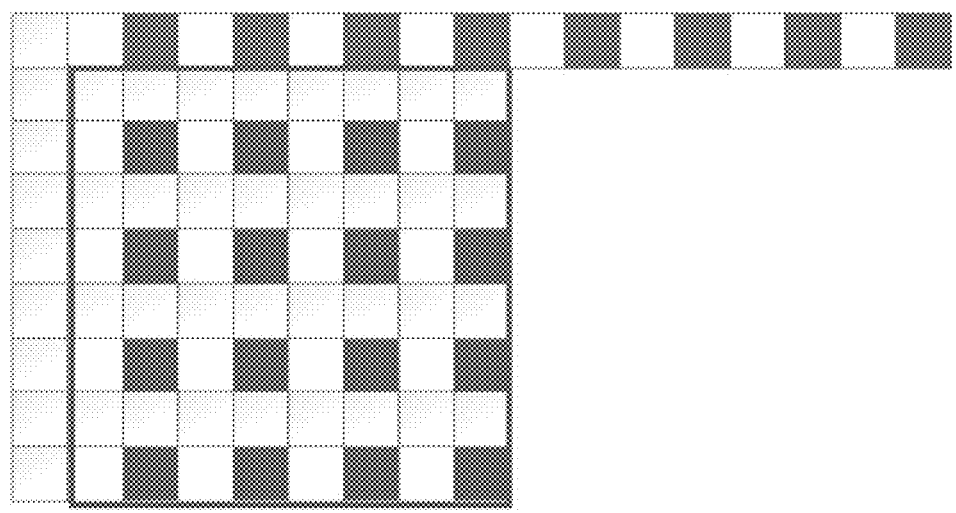

(g) In one example as shown in FIG. 6D, luma sample at position "D" in FIG. 4 is used to correspond to the chroma sample. The above neighboring samples and above-right neighboring samples are used in the training process to derive the linear model.

Figure 6E:
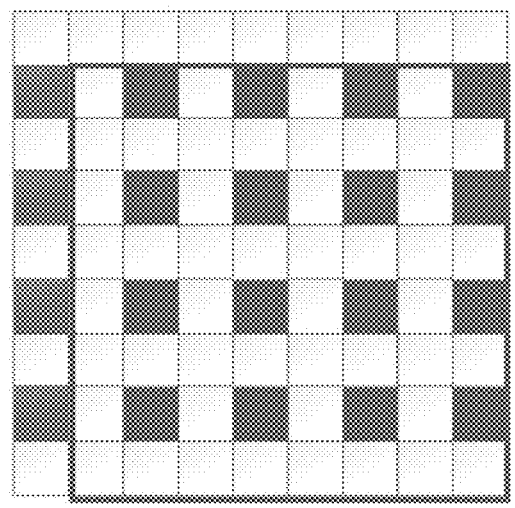

(h) In one example as shown in FIG. 6E, luma sample at position "B" in FIG. 4 is used to correspond to the chroma sample. The left neighboring samples are used in the training process to derive the linear model.

Figure 6F:
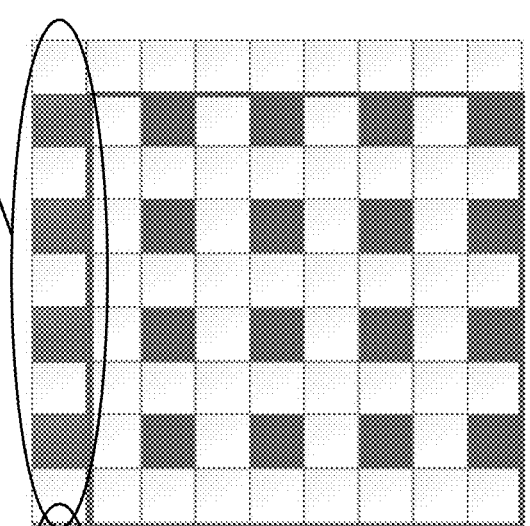

(i) In one example as shown in FIG. 6F, luma sample at position "B" in FIG. 4 is used to correspond to the chroma sample. The left neighboring samples and left-bottom neighboring samples are used in the training process to derive the linear model.

Figure 6G:
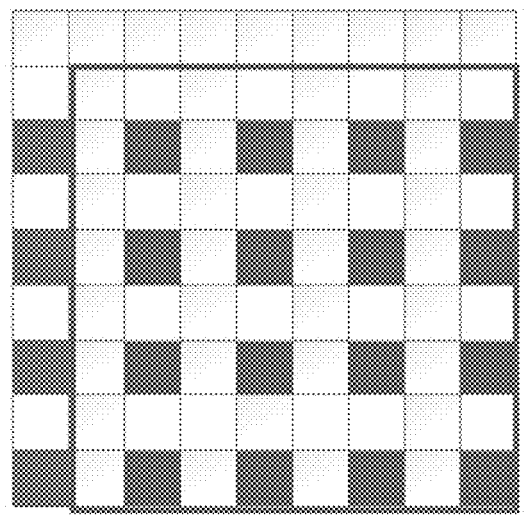

(j) In one example as shown in FIG. 6G, luma sample at position "D" in FIG. 4 is used to correspond to the chroma sample. The left neighboring samples are used in the training process to derive the linear model.

Figure 6H:
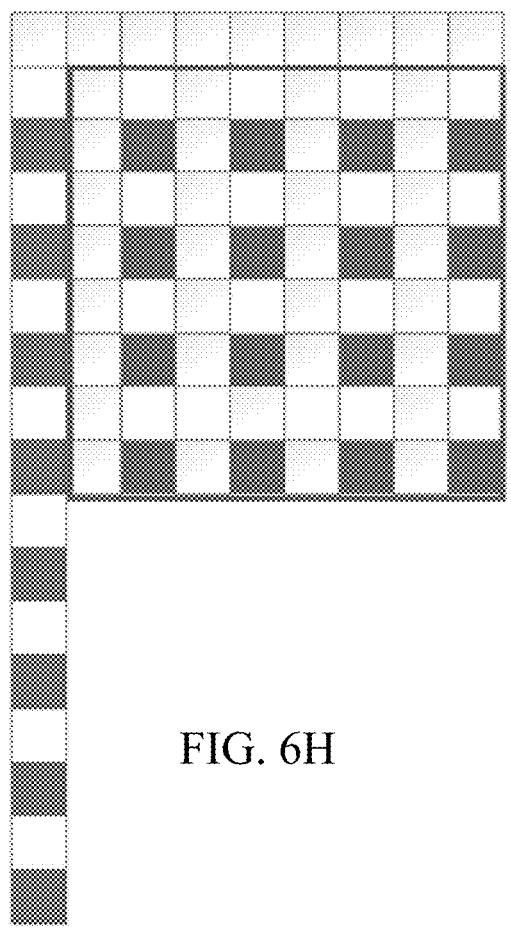

(k) In one example as shown in FIG. 6H, luma sample at position "D" in FIG. 4 is used to correspond to the chroma sample. The left neighboring samples and left-bottom neighboring samples are used in the training process to derive the linear model.

Figure 6I:
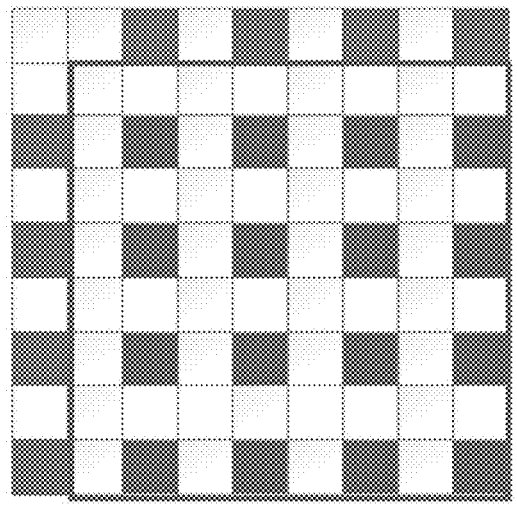

(l) In one example as shown in FIG. 6I, luma sample at position "D" in FIG. 4 is used to correspond to the chroma sample. The above neighboring samples and left neighboring samples are used in the training process to derive the linear model.

Figure 6J:
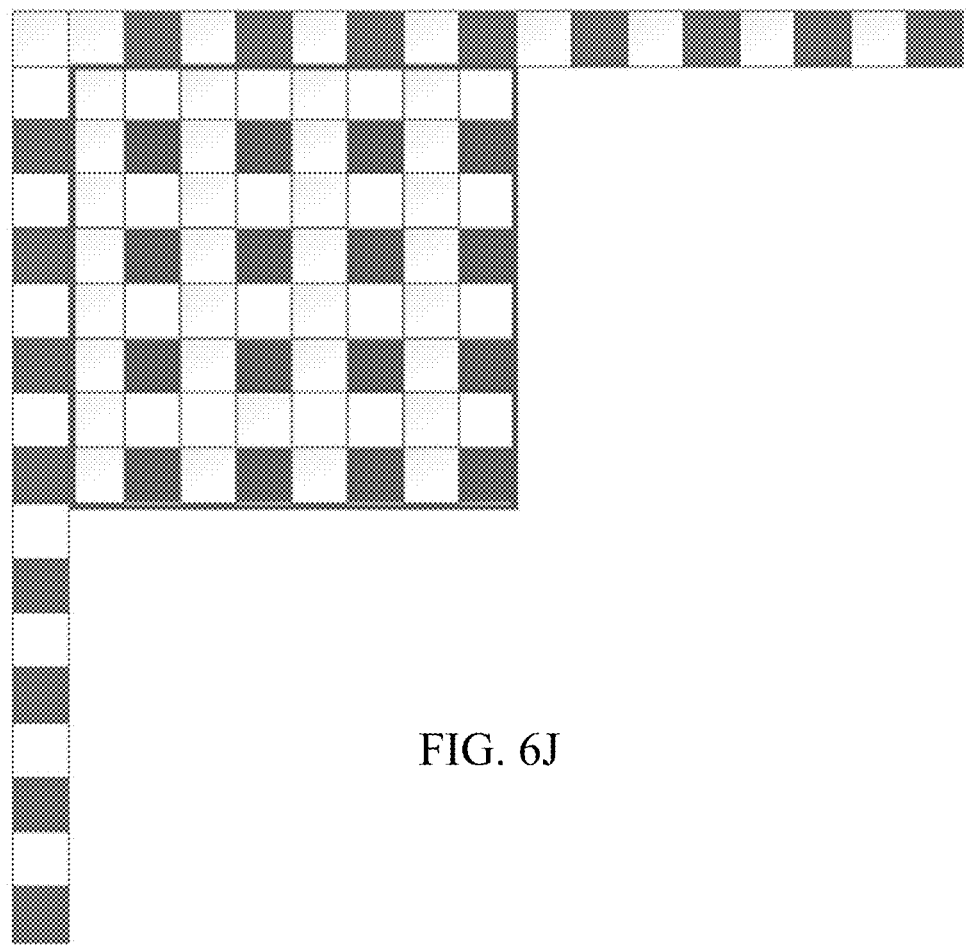

(m) In one example as shown in FIG. 6J, luma sample at position "D" in FIG. 4 is used to correspond to the chroma sample. The above neighboring samples, left neighboring samples, above-right neighboring samples and left-bottom neighboring samples are used in the training process to derive the linear model.

Example 2. In one example, it is proposed that CCLM only requires neighbouring luma samples which are used in normal intra-prediction process, that is, other neighboring luma samples are disallowed to be used in the CCLM process. In one example, CCLM is done with 2-tap filtering on luma samples. FIGS. 7A-7D show examples on an 8×8 luma block corresponding to a 4×4 chroma block.

Figure 7A:
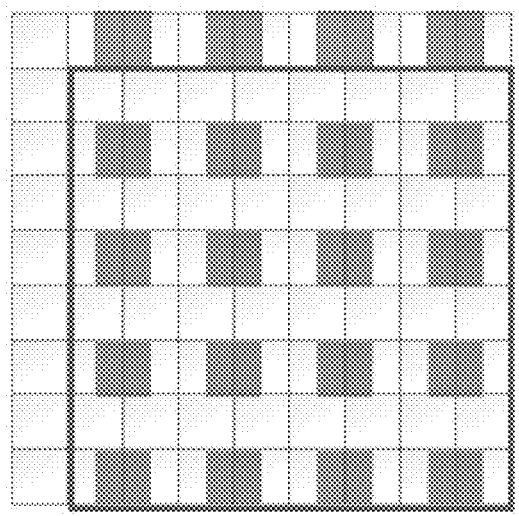
FIGS. 7A-7D show examples of CCLM only requiring neighboring luma samples used in normal intra-prediction.

(a) In one example as shown in FIG. 7A, luma sample at position "C" and position "D" in FIG. 4 are filtered as F(C, D) to be used to correspond to the chroma sample. The above neighboring samples are used in the training process to derive the linear model.

Figure 7B:
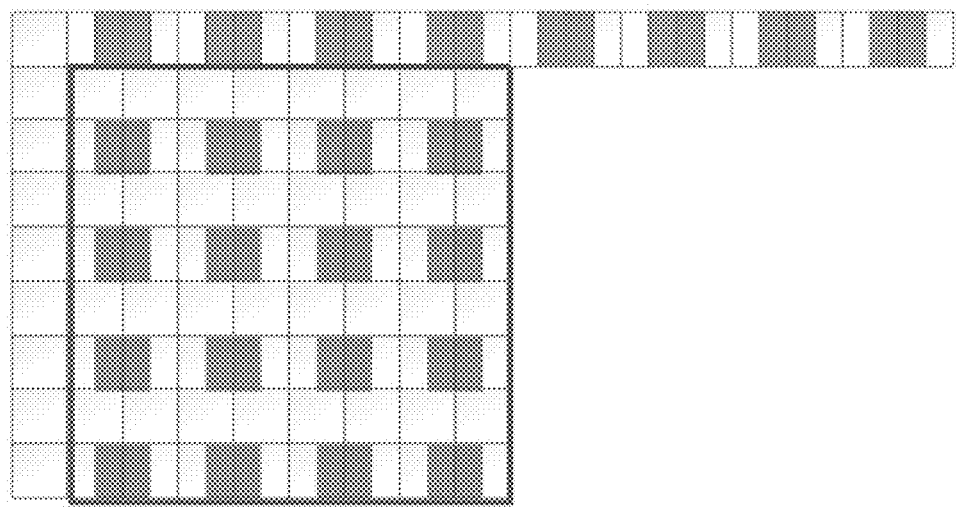

(b) In one example as shown in FIG. 7B, luma sample at position "C" and position "D" in FIG. 4 are filtered as F(C, D) to be used to correspond to the chroma sample. The above neighboring samples and above-right neighboring samples are used in the training process to derive the linear model.

Figure 7C:
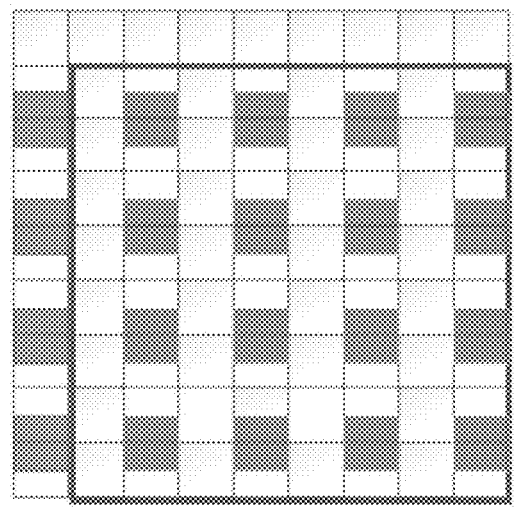

(c) In one example as shown in FIG. 7C, luma sample at position "B" and position "D" in FIG. 4 are filtered as F(B, D) to be used to correspond to the chroma sample. The left neighboring samples are used in the training process to derive the linear model.

Figure 7D:
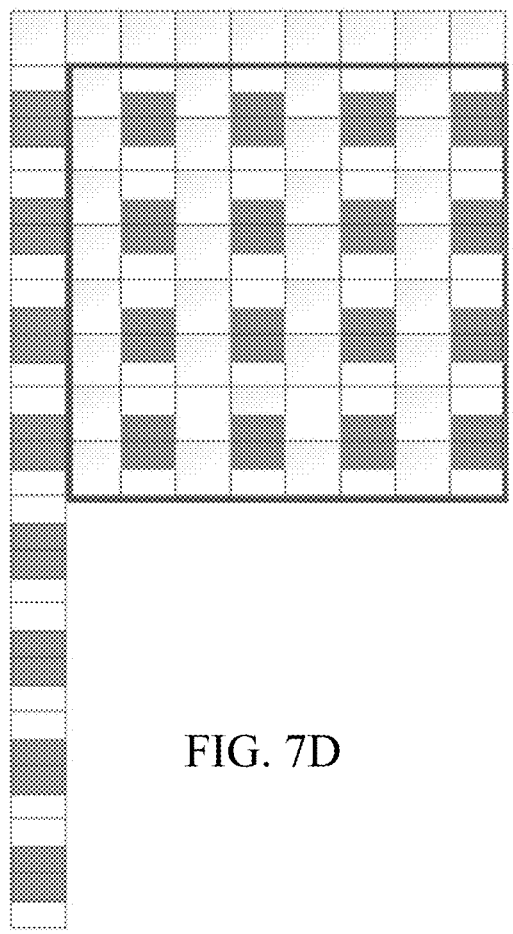

(d) In one example as shown in FIG. 7D, luma sample at position "B" and position "D" in FIG. 4 are filtered as F(B, D) to be used to correspond to the chroma sample. The left neighboring samples and left-bottom neighboring samples are used in the training process to derive the linear model.

(e) In one example, F is defined as F(X,Y)=(X+Y)>>1. Alternatively, F(X,Y)=(X+Y+1)>>1.

Example 3. In one example, it is proposed that the proposed simplified CCLM methods (e.g., Examples 1 and 2) can be applied in a selective way. That is, different block within a region/slice/picture/sequence may choose different kinds of simplified CCLM methods.

(a) In one embodiment, the encoder selects one kind of simplified CCLM method from a predefined candidate set and signals it to the decoder.

(i) For example, the encoder can select between Example 1(a) and Example 1(e). Alternatively, it can select between Example 1(b) and Example 1(f). Alternatively, it can select between Example 1(c) and Example 1(g). Alternatively, it can select between Example 1(d) and Example 1(h). Alternatively, it can select between Example 2(a) and Example 2(c). Alternatively, it can select between Example 2(b) and Example 2(d).

(ii) The candidate set to be selected from and the signaling may depend on the shape or size of the block. Suppose W and H represent the width and height of the chroma block, T1, and T2 are integers.

(1) In one example, if W<=T1 and H<=T2, there is no candidate, e.g., CCLM is disabled. For example, T1=T2=2.

(2) In one example, if W<=T1 or H<=T2, there is no candidate, e.g., CCLM is disabled. For example, T1=T2=2.

(3) In one example, if W×H<=T1, there is no candidate, e.g., CCLM is disabled. For example, T1=4.

(4) In one example, if W<=T1 and H<=T2, there is only one candidate such as Example 1(i). No CCLM method selection information is signaled. For example, T1=T2=4.

(5) In one example, if W<=T1 or H<=T2, there is only one candidate such as Example 1(i). No CCLM method selection information is signaled. For example, T1=T2=4.

(6) In one example, if W×H<=T1, there is only one candidate such as Example 1(i). No CCLM method selection information is signaled. For example, T1=16.

(7) In one example, if W>H, there is only one candidate such as Example 1(a). No CCLM method selection information is signaled. Alternatively, if W>H (or W>N*H wherein N is a positive integer), only candidates (or some candidates) using above or/and above-right neighboring reconstructed samples in deriving CCLM parameters are included in the candidate set.

(8) In one example, if W<H, there is only one candidate such as Example 1(e). No CCLM method selection information is signaled. Alternatively, if W<H (or N*W<H), only candidates (or some candidates) using left or/and left-bottom neighboring reconstructed samples in deriving CCLM parameters are included in the candidate set.

(b) In one embodiment, both the encoder and decoder select a simplified CCLM method based the same rule. The encoder does not signal it to the decoder. For example, the selection may depend on the shape or size of the block. In one example, if the width is larger than the height, Example 1(a) is selected, otherwise, Example 1(e) is selected.

(c) One or multiple sets of simplified CCLM candidates may be signaled in sequence parameter set/picture parameter set/slice header/CTUs/CTBs/groups of CTUs.

Example 4. In one example, it is proposed that multiple CCLM methods (e.g., Examples 1 and 2) may be applied to the same chroma block. That is, one block within a region/slice/picture/sequence may choose different kinds of simplified CCLM methods to derive multiple intermediate chroma prediction blocks and the final chroma prediction block is derived from the multiple intermediate chroma prediction blocks.

(a) Alternatively, multiple sets of CCLM parameters (e.g., α and β) may be firstly derived from multiple selected CCLM methods. One final set of CCLM parameters may be derived from the multiple sets and utilized for chroma prediction block generation process.

(b) The selection of multiple CCLM methods may be signaled (implicitly or explicitly) in a similar way as described in Example 3.

(c) Indication of the usage of the proposed method may be signaled in sequence parameter set/picture parameter set/slice header/groups of CTUs/CTUs/coding blocks.

Example 5. In one example, whether and how to apply the proposed simplified CCLM methods may depend on the position of the current block.

Figure 8A:
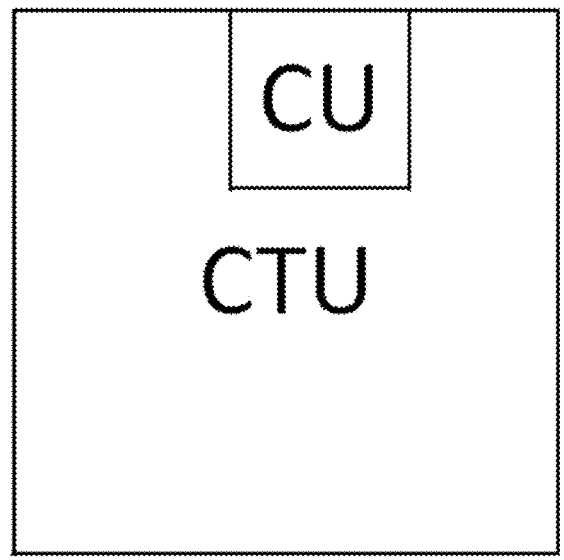
FIGS. 8A and 8B show examples of a coding unit (CU) at a boundary of a coding tree unit (CTU).

(a) In one example, one or more of the proposed methods is applied on CUs that locate at the top boundary of the current CTU as shown in FIG. 8A.

Figure 8B:
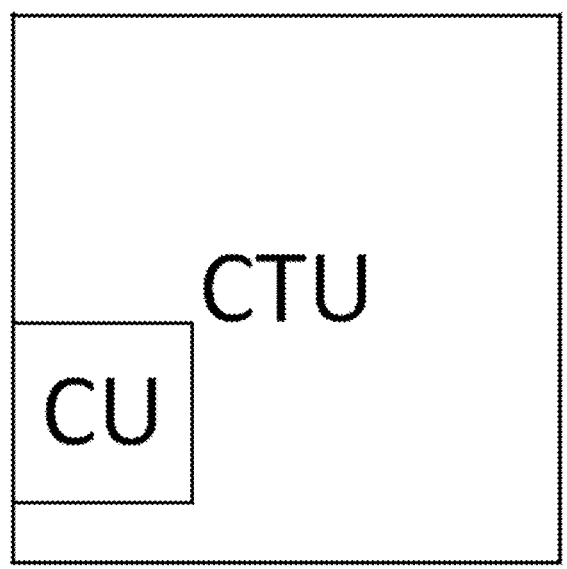

(b) In one example, one or more of the proposed methods is applied on CUs that locate at the left boundary of the current CTU as shown in FIG. 8B.

(c) In one example, one or more of the proposed methods is applied in both the above cases.

Figure 19A:
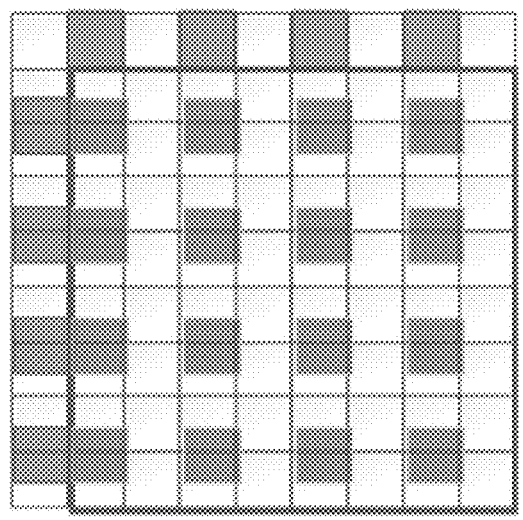
FIG. 19A-19B depict down-sampled positions for luma samples inside and outside the current block. Suppose the current blocks size is W×H.
Figure 19B:
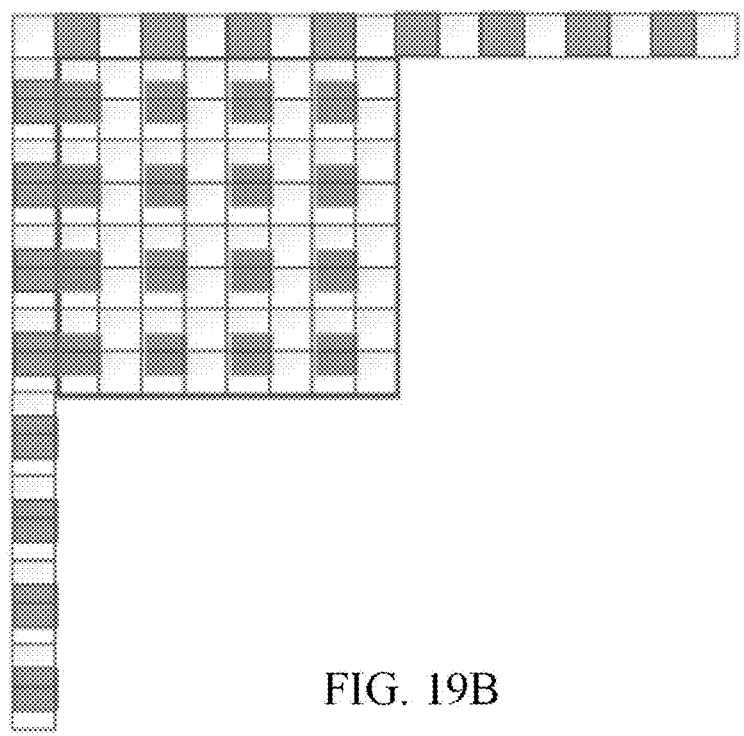

Example 6. In one example, luma samples are down-sampled to correspond to chroma samples in different ways when they are inside the current block or outside the current block. Furthermore, outside luma samples down-sampled to correspond to chroma samples in different ways when they are left to the current block or above to the current block.

a. In one example, luma samples are down-sampled as specified below as shown in FIG. 19A-19B:

i. Luma samples inside the current block are down-sampled in the same way as in JEM.

ii. Luma samples outside the current block and above to the current block are down-sampled to position C or D.

1. Alternatively, Luma samples are down-sampled to position C with a filter. Suppose the luma samples above adjacent to the current block are denoted as a[i], then d[i]=(a[2i−1]+2*a[2i]+a[2i+1]+2)>>2, where d[i] represents the down-sampled luma samples.

a. If the sample a[2i−1] is unavailable, d[i]=(3*a[2i]+a[2i+1]+2)>>2;

b. If the sample a[2i+1] is unavailable, d[i]=(a[2i−1]+3*a[2i]+2)>>2;

iii. Luma samples outside the current block and left to the current block are down-sampled to position B or D, 1. Alternatively, Luma samples are down-sampled to the half position between B and D. Suppose the luma samples left adjacent to the current block are denoted as a[j], then d[j]=(a[2j]+a[2j+1]+1)>>1, where d[j] represents the down-sampled luma samples.

Example 7. In one example, the proposed luma down-sampled method can be applied to LM mode in JEM or VTM, and it can also be applied to MMLM mode in JEM. Besides, it can also be applied to left-LM mode which only uses left neighboring samples to derive the linear model, or the above-LM mode, which only uses above neighboring samples to derive the linear model.

Example 8. Boundary filtering can be applied to LM mode, MMLM mode, left-LM mode or above-LM mode, no matter what kind of down-sampling filter is applied.

a. Suppose the reconstructed chroma samples above adjacent to the current block are denoted as a[−1][j], the LM predicted sample at the ith row and jth column is a[i][j], then the prediction sample after boundary filtering is calculated as a'[i][j]=(w1*a[i][j]+w2*a[−1][i]+2N−1)>>N, where w1+w2=2N.

i. In one example, the boundary filtering is only applied if i<=K. K is an integer such as 0 or 1. For example, K=0, w1=w2=1. In another example, K=0, w1=3, w2=1.

ii. In one example, w1 and w2 depend on the row index (i). For example, K=1, w1=w2=1 for samples a[0][j], but w1=3 and w2=1 for samples a[1][j].

b. Suppose the reconstructed chroma samples left adjacent to the current block are denoted as a[i][−1], the LM predicted sample at the ith row and jth column is a[i][j], then the prediction sample after boundary filtering is calculated as a'[i][j]=(w1*a[i][j]+w2*a[i][−1]+2N−1)>>N, where w1+w2=2N.

i. In one example, the boundary filtering is only applied if j<=K. K is an integer such as 0 or 1. For example, K=0, w1=w2=1. In another example, K=0, w1=3, w2=1.

ii. In one example, w1 and w2 depend on the column index (i). For example, K=1, w1=w2=1 for samples a[0][j], but w1=3 and w2=1 for samples a[1][j].

Figure 9:
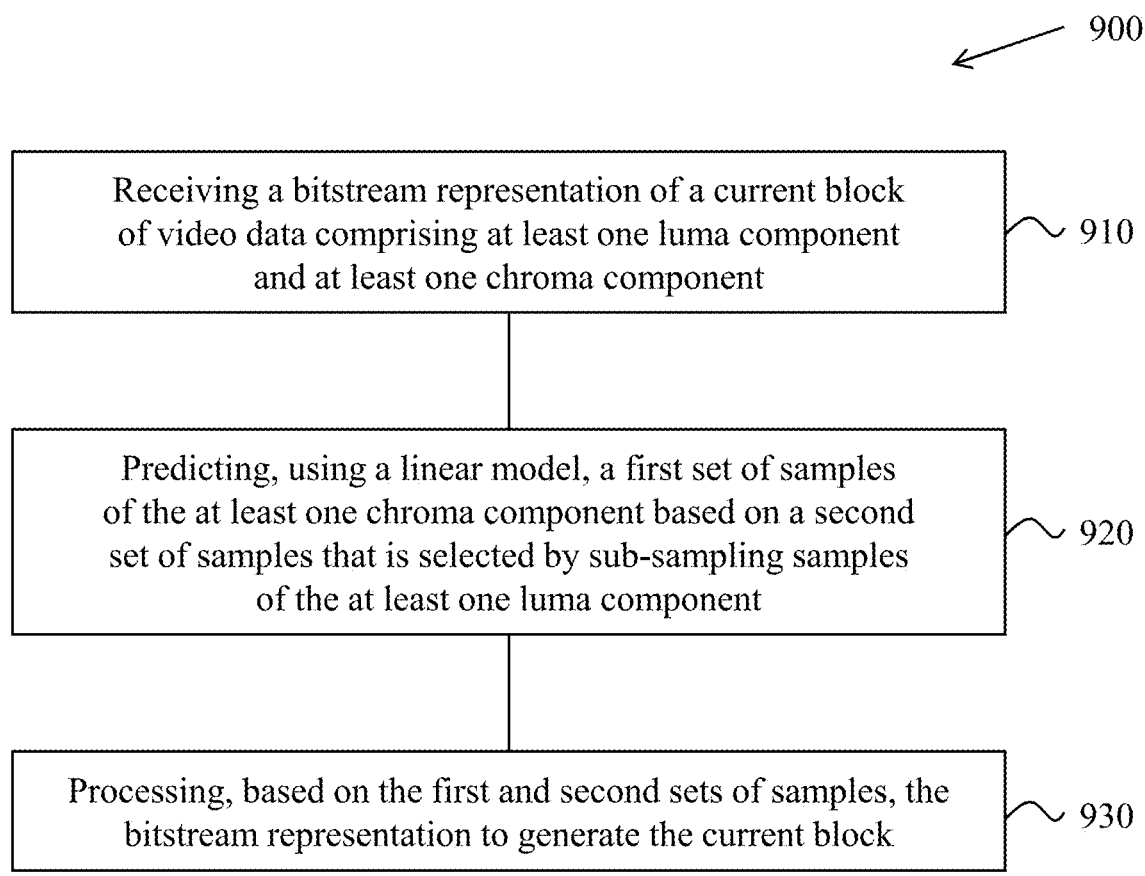
FIG. 9 shows a flowchart of an example method for cross-component prediction in accordance with the disclosed technology.

FIG. 9 shows a flowchart of an exemplary method for cross-component prediction. The method 900 includes, at step 910, receiving a bitstream representation of a current block of video data comprising at least one luma component and at least one chroma component.

The method 900 includes, at step 920, predicting, using a linear model, a first set of samples of the at least one chroma component based on a second set of samples that is selected by sub-sampling samples of the at least one luma component.

The method 900 includes, at step 930, processing, based on the first and second sets of samples, the bitstream representation to generate the current block.

In some embodiments, the method 900 further includes deriving, based on a training samples, parameters of the linear model. For example, and in the context of Example 1, the training samples comprise one or more samples of a block of luma samples associated with a chroma sample that is a neighbor of the current block. In some embodiments, the block of luma samples is a 2×2 block of luma samples. In other embodiments, it may be of size $2^N \times 2^N$.

In some embodiments, at least one of the luma samples corresponds to the chroma sample, and the training samples may be selected as described in Examples 1(d)-1(m). For example, in some embodiments, the block of luma samples is a 2×2 block of luma samples. In some embodiments, a lower left sample of the block of luma samples corresponds to the chroma sample, and the training samples comprise an upper neighboring sample of the lower left sample. In some embodiments, a lower left sample of the block of luma samples corresponds to the chroma sample, and the training samples comprise an upper neighboring sample and an upper right neighboring sample of the lower left sample. In some embodiments, a lower right sample of the block of luma samples corresponds to the chroma sample, and the training samples comprise an upper neighboring sample and an upper right neighboring sample of the lower right sample. In some embodiments, an upper right sample of the block of luma samples corresponds to the chroma sample, and the training samples comprise a left neighboring sample of the upper right sample. In some embodiments, an upper right sample of the block of luma samples corresponds to the chroma sample, and the training samples comprise a left neighboring sample and a lower left neighboring sample of the upper right sample. In some embodiments, a lower right sample of the block of luma samples corresponds to the chroma sample, and the training samples comprise a left neighboring sample of the lower right sample. In some embodiments, a lower right sample of the block of luma samples corresponds to the chroma sample, and the training samples comprise a left neighboring sample and a lower left neighboring sample of the lower right sample. In some embodiments, a lower right sample of the block of luma samples corresponds to the chroma sample, and the training samples comprise a left neighboring sample and an upper neighboring sample of the lower right sample. In some embodiments, a lower right sample of the block of luma samples corresponds to the chroma sample, and the training samples comprise an upper neighboring sample, a left neighboring sample, an upper right neighboring sample and a lower left neighboring sample of the lower right sample.

Figure 10:
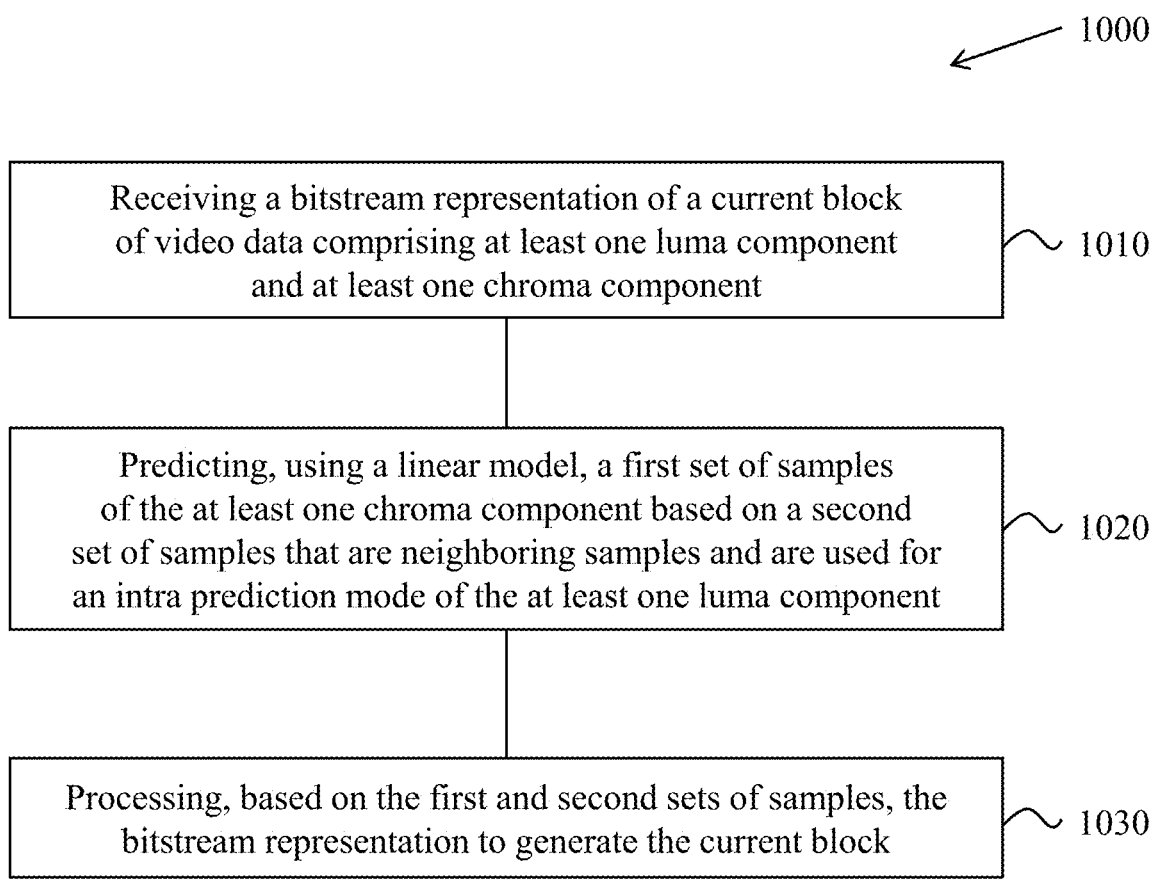
FIG. 10 shows a flowchart of another example method for cross-component prediction in accordance with the disclosed technology.

FIG. 10 shows a flowchart of another exemplary method for cross-component prediction. This example includes some features and/or steps that are similar to those shown in FIG. 9, and described above. At least some of these features and/or components may not be separately described in this section. The method 1000 includes, at step 1010, receiving a bitstream representation of a current block of video data comprising at least one luma component and at least one chroma component.

The method 1000 includes, at step 1020, predicting, using a linear model, a first set of samples of the at least one chroma component based on a second set of samples that are neighboring samples and are used for an intra prediction mode of the at least one luma component.

The method 1000 includes, at step 1030, processing, based on the first and second sets of samples, the bitstream representation to generate the current block.

In some embodiments, the method 1000 further includes deriving, based on training samples, parameters of the linear model. For example, and in the context of Example 2, the training samples comprise one or more samples of a block of luma samples associated with a chroma sample that is a neighbor of the current block. In some embodiments, the block of luma samples is a 2×2 block of luma samples. In other embodiments, it may be of size $2^N \times 2^N$.

In some embodiments, a filtered sample based on two of the luma samples corresponds to the chroma sample, and the training samples may be selected as described in Examples 2(a)-2(d). For example, in some embodiments, the block of luma samples is a 2×2 block of luma samples. In some embodiments, a lower left sample and a lower right sample of the block of luma samples are filtered using a two-tap filter to generate a filtered sample that corresponds to the chroma sample, and wherein the training samples comprise an upper neighboring sample to each of the lower left sample and the lower right sample. In some embodiments, a lower left sample and a lower right sample of the block of luma samples are filtered using a two-tap filter to generate a filtered sample that corresponds to the chroma sample, and wherein the training samples comprise an upper neighboring sample and an upper right neighboring sample to each of the lower left sample and the lower right sample. In some embodiments, an upper right sample and a lower right sample of the block of luma samples are filtered using a two-tap filter to generate a filtered sample that corresponds to the chroma sample, and wherein the training samples comprise a left neighboring sample to each of the upper right sample and the lower right sample. In some embodiments, an upper right sample and a lower right sample of the block of luma samples are filtered using a two-tap filter to generate a filtered sample that corresponds to the chroma sample, and wherein the training samples comprise a left neighboring sample and a lower left neighboring sample to each of the upper right sample and the lower right sample.

Figure 11:
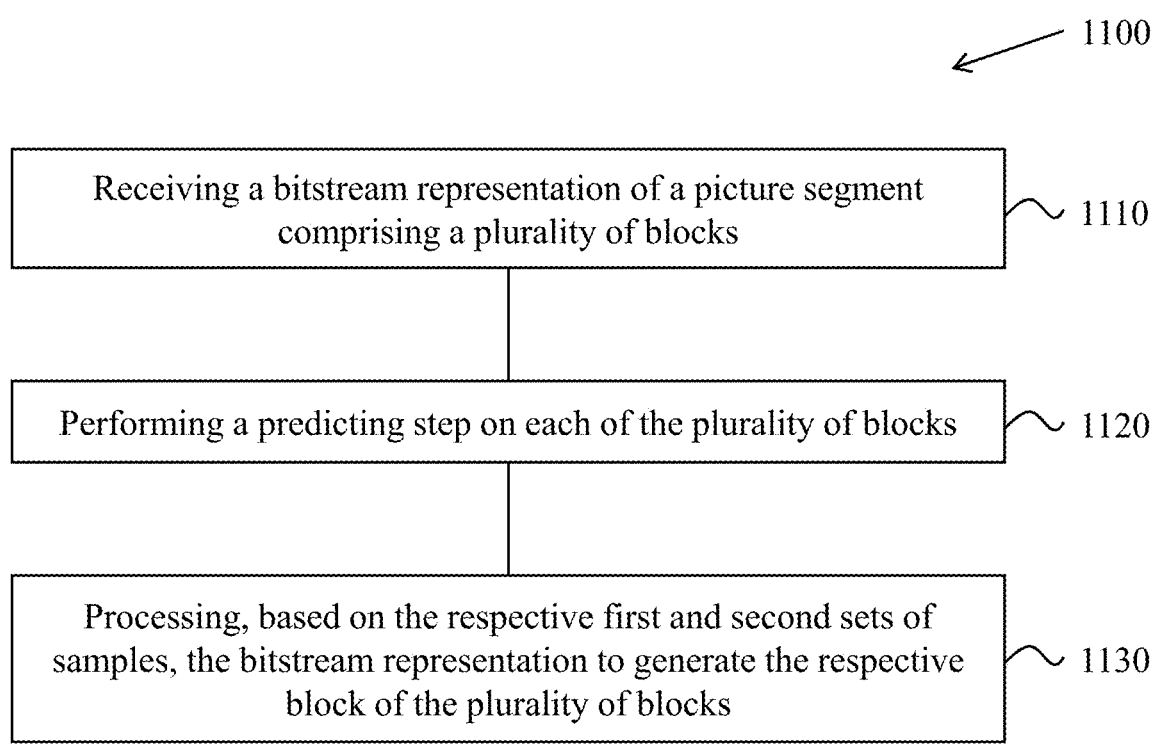
FIG. 11 shows a flowchart of yet another example method for cross-component prediction in accordance with the disclosed technology.

FIG. 11 shows a flowchart of another exemplary method for cross-component prediction. This example includes some features and/or steps that are similar to those shown in FIGS. 9 and 10, and described above. At least some of these features and/or components may not be separately described in this section. The method 1100 includes, at step 1110, receiving a bitstream representation of a picture segment comprising a plurality of blocks, the plurality of blocks comprising a current block, and each of the plurality of blocks comprising a chroma component and a luma component.

The method 1100 includes, at step 1120, performing a predicting step on each of the plurality of blocks.

The method 1100 includes, at step 1130, processing, based on the respective first and second sets of samples, the bitstream representation to generate the respective block of the plurality of blocks.

In some embodiments, and in the context of Example 3, the predicting step may be selected from the predicting step described in method 900, whereas in other embodiments, the predicting step may be selected from the predicting step described in method 1000.

Figure 12:
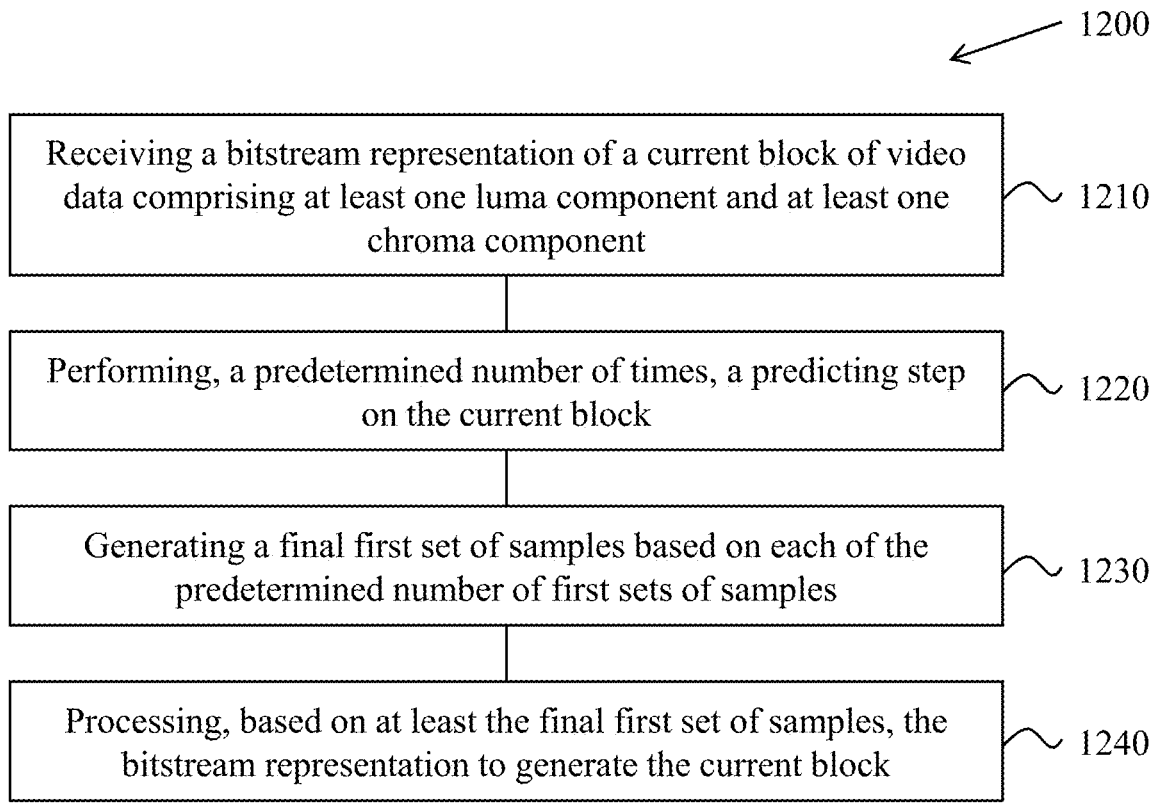
FIG. 12 shows a flowchart of yet another example method for cross-component prediction in accordance with the disclosed technology.

FIG. 12 shows a flowchart of another exemplary method for cross-component prediction. This example includes some features and/or steps that are similar to those shown in FIGS. 9-11, and described above. At least some of these features and/or components may not be separately described in this section. The method 1200 includes, at step 1210, receiving a bitstream representation of a current block of video data comprising at least one luma component and at least one chroma component.

The method 1200 includes, at step 1220, performing, a predetermined number of times, a predicting step on the current block.

The method 1200 includes, at step 1230, generating a final first set of samples based on each of the predetermined number of first sets of samples.

The method 1200 includes, at step 1240, processing, based on at least the final first set of samples, the bitstream representation to generate the current block.

In some embodiments, and in the context of Example 4, the predicting step may be selected from the predicting step described in method 900, whereas in other embodiments, the predicting step may be selected from the predicting step described in method 1000.

In some embodiments, and in the context of Example 5, the performing the predicting step is based on a position of the current block in a current CTU. In one example, the position of the current block is at a top boundary, whereas in another example, the position of the current block is at a left boundary of the current CTU.

In some embodiments, a method of video coding includes determining a dimension of a first video block, determining parameters regarding application of a CCLM prediction mode based on the determination of the dimension, and performing further processing of the first video block using the CCLM prediction mode in accordance with the parameters. In various embodiments, the CCLM mode may include one or more of CCLM-TL, CCLM-T, or CCLM-L.

In some embodiments, the CCLM prediction mode excludes CCLM-T based on a width of the dimension being less than or equal to a threshold value.

In some embodiments, the CCLM prediction mode excludes CCLM-L based on a height of the dimension being less than or equal to a threshold value.

In some embodiments, the CCLM prediction mode excludes CCLM-TL based on a height of the dimension being less than a first threshold value, and based on a width of the dimension being less than a second threshold value.

In some embodiments, the CCLM prediction mode excludes CCLM-TL based on a width of the dimension multiplied by a height of the dimension being less than or equal to a threshold value.

In some embodiments, a flag to signal that the CCLM prediction mode is CCLM-T is not signaled and inferred to be 0 based on CCLM-T not being able to be applied.

In some embodiments, a flag to signal that the CCLM prediction mode is CCLM-L is not signaled and inferred to be 0 based on CCLM-L not being able to be applied.

In some embodiments, a flag to signal that the CCLM prediction mode is CCLM-TL is not signaled and inferred to be 0 based on CCLM-TL not being able to be applied.

In some embodiments, the method further includes: determining a color format of the first video block, and wherein determining the parameters is based on the determination of the color format.

In some embodiments, the CCLM prediction mode is CCLM-T, and CCLM-T uses above reference samples to derive linear model parameters.

In some embodiments, the CCLM prediction mode is CCLM-L, and CCLM-L uses left reference samples to derive linear model parameters.

In some embodiments, the CCLM prediction mode is CCLM-T, and CCLM-T is used to derive multiple linear models from above reference samples.

In some embodiments, the CCLM prediction mode is CCLM-L, and CCLM-T is used to derive multiple linear models from left reference samples.

The following listing of technical solutions may be preferred implementations in some embodiments.

Figure 14:
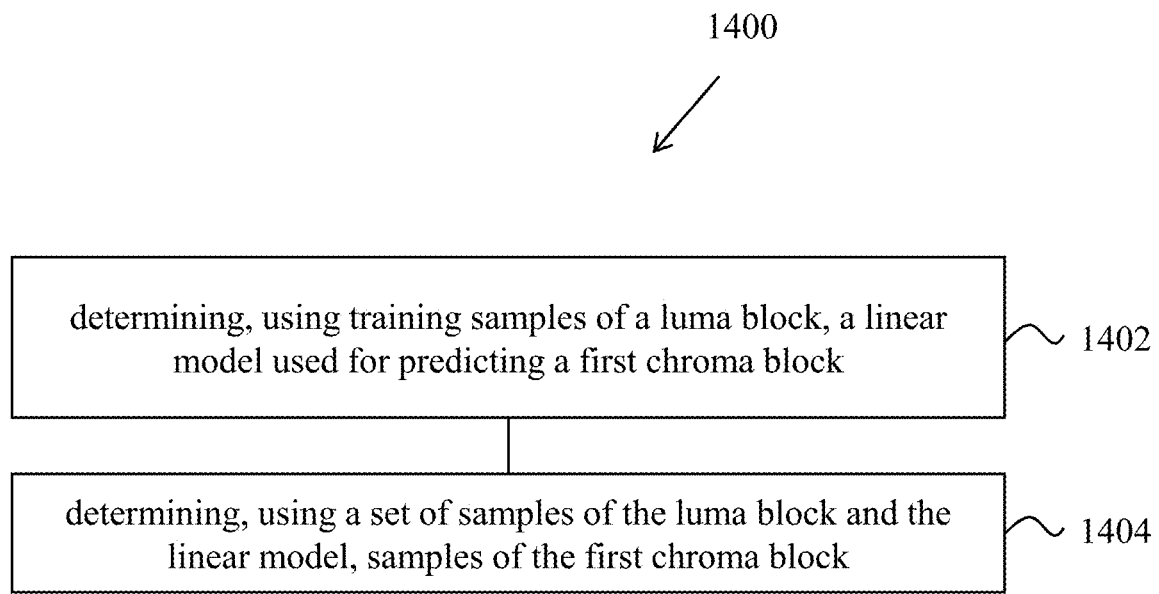
FIGS. 14-18 are flowcharts of various methods of video processing.

1. A method for video processing (e.g., method 1400 shown in FIG. 14), comprising: determining (1402), using training samples of a luma block, a linear model used for predicting a first chroma block; and determining (1404), using a set of samples of the luma block and the linear model, samples of the first chroma block; wherein the training samples or the set of samples are determined without using a multi-tap downsampling filter.

2. The method of solution 1, wherein the linear model comprises a first parameter, alpha, and a second parameter, beta, and wherein the alpha and beta are derived from the training samples by sub-sampling training samples.

3. The method of solution 2, wherein the sub-sampling uses non-consecutive luma samples.

4. The method of solution 1, wherein the set of samples correspond to luma samples co-located with the samples of the first chroma block.

5. The method of any of solutions 1-4, wherein the training samples corresponds to neighboring samples above the luma block and wherein the set of samples of the luma block corresponds to a lower left pixel of the luma block.

6. The method of any of solutions 1-4, wherein the training samples corresponds to neighboring samples above and to above-right of the luma block and wherein the set of samples of the luma block corresponds to a lower left pixel of the luma block.

7. The method of any of solutions 1-4, wherein the training samples corresponds to neighboring samples above the luma block and wherein the set of samples of the luma block corresponds to a lower right pixel of the luma block.

8. The method of any of solutions 1-4, wherein the training samples corresponds to neighboring samples above and above-right of the luma block and wherein the set of samples of the luma block corresponds to a lower right pixel of the luma block.

9. The method of any of solutions 1-4, wherein the training samples corresponds to neighboring samples to left of the luma block and wherein the set of samples of the luma block corresponds to an upper right pixel of the luma block.

10. The method of any of solutions 1-4, wherein the training samples corresponds to neighboring samples above the luma block and wherein the set of samples of the luma block corresponds to a lower left pixel of the luma block.

11. The method of any of solutions 1-4, wherein the training samples corresponds to neighboring samples to left of the luma block and wherein the set of samples of the luma block corresponds to a lower right pixel of the luma block.

12. The method of any of solutions 1-4, wherein the training samples corresponds to neighboring samples to left and left-bottom of the luma block and wherein the set of samples of the luma block corresponds to a lower right pixel of the luma block.

13. The method of any of solutions 1-4, wherein the training samples corresponds to neighboring samples above to left of the luma block and wherein the set of samples of the luma block corresponds to a lower right pixel of the luma block.

14. The method of any of solutions 1-4, wherein the training samples corresponds to neighboring samples above, left, above-right and left-bottom of the luma block and wherein the set of samples of the luma block corresponds to a lower right pixel of the luma block.

The previous section provides additional features of the above solutions (e.g., item 1).

Figure 15:
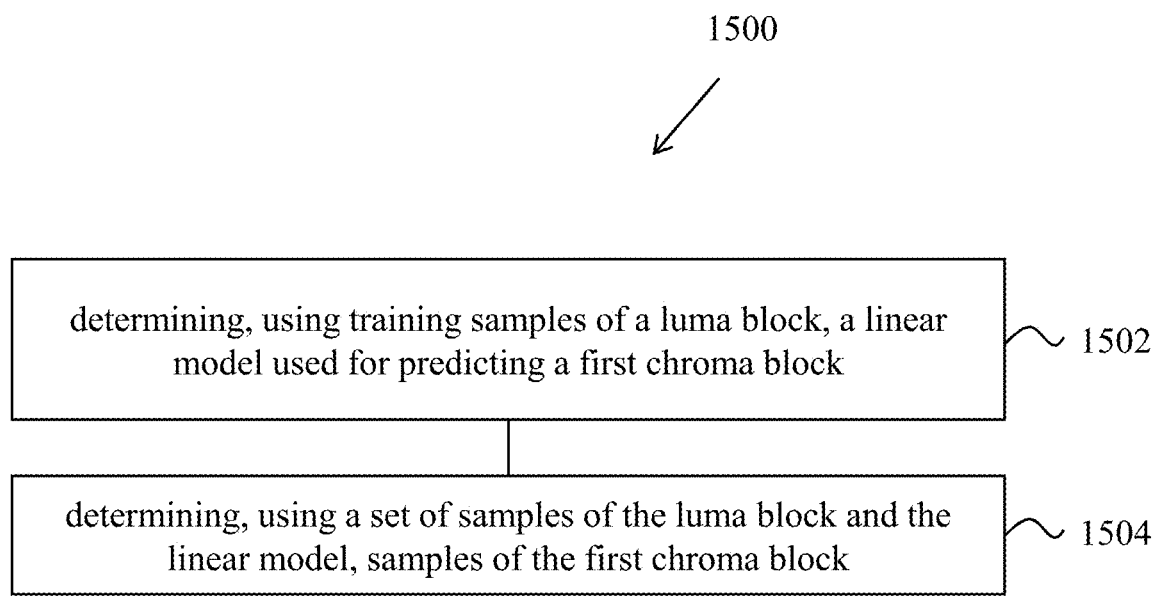

15. A method for video processing (e.g., method 1500 shown in FIG. 15), comprising: determining (1502), using training samples of a luma block, a linear model used for predicting a first chroma block; and determining (1504), using a set of samples of the luma block and the linear model, samples of the first chroma block; wherein the training luma samples are limited to luma samples neighboring the luma block that are at positions used for an intra prediction process.

16. The method of solution 15, wherein a chroma sample in the first chroma block is determined by applying a 2-tap filter to a first sample and a second sample in the set of samples of the luma block at a position corresponding to a position of the chroma block.

17. The method of solution 16, wherein the first sample is a lower left sample and the second sample is a lower right sample and wherein the training samples correspond to above neighboring samples.

18. The method of solution 16, wherein the first sample is a lower left sample and the second sample is a lower right sample and wherein the training samples correspond to above and above-right neighboring samples.

19. The method of solution 16, wherein the first sample is an upper right sample and the second sample is a lower right sample and wherein the training samples correspond to left neighboring samples.

20. The method of solution 16, wherein the first sample is an upper right sample and the second sample is a lower right sample and wherein the training samples correspond to left and left-bottom neighboring samples.

21. The method of any of solutions 16 to 20, wherein the two-tap filter is an averaging filter.

22. The method of any of solutions 16 to 21, wherein the two-tap filter averages a sum of one plus the first sample plus the second sample.

The previous section provides additional features of the above solutions (e.g., item 1).

Figure 16:
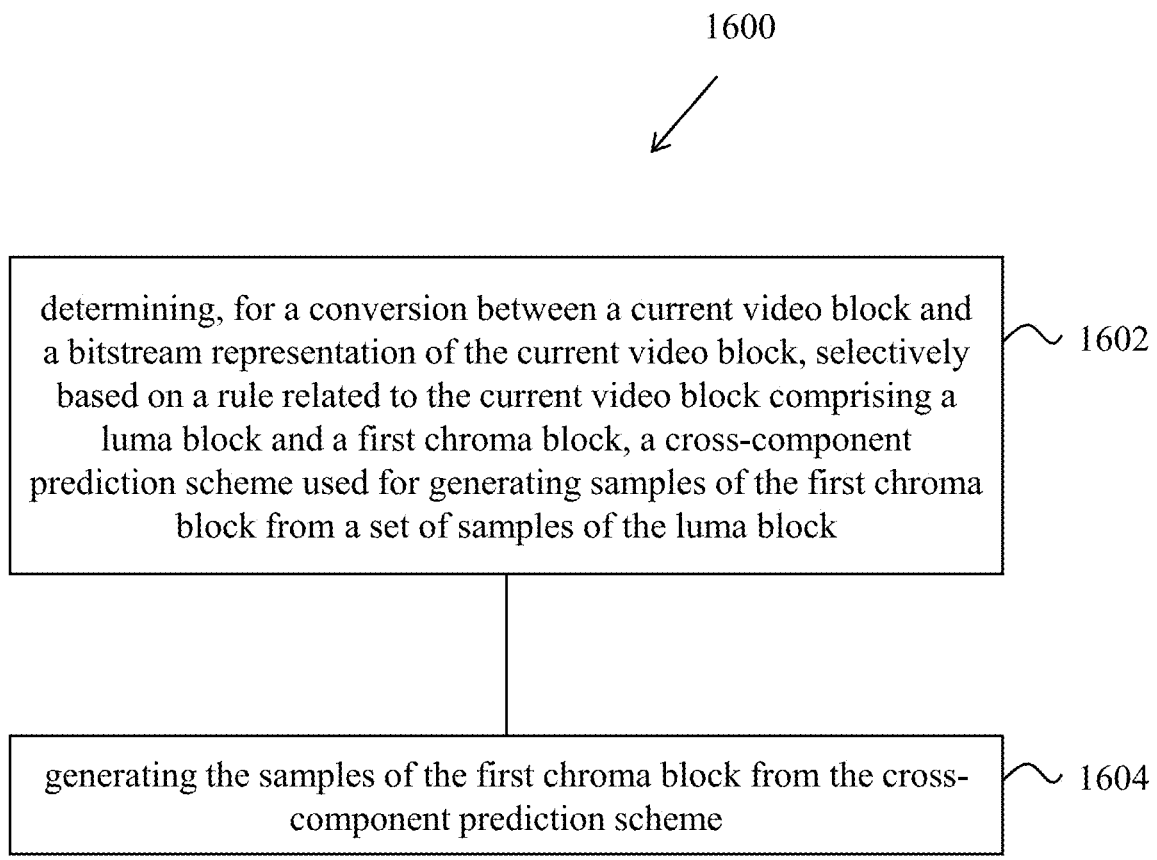

23. A method of video processing (e.g., method 1600 depicted in FIG. 16), comprising: determining (1602), for a conversion between a current video block and a bitstream representation of the current video block, selectively based on a rule related to the current video block comprising a luma block and a first chroma block, a cross-component prediction scheme used for generating samples of the first chroma block from a set of samples of the luma block; and generating (1604) the samples of the first chroma block from the cross-component prediction scheme, wherein the cross-component prediction scheme is one of: a first cross-component prediction scheme that uses a linear model generated from training samples of the luma block such that the training samples and the set of samples are determined without using a multi-tap downsampling filter; or a second cross-component prediction scheme in which the training luma samples are limited to luma samples neighboring the current video block at positions used for an intra prediction process; wherein the rule specifies to select the cross-component prediction scheme depending on a video region to which the current video block belongs.

24. The method of solution 23, wherein the cross-component prediction scheme selected for the current video block is different from another cross-component prediction scheme selected for another video block in the video region.

25. The method of solution 24, wherein the video region comprises a video slice.

26. The method of solution 24, wherein the video region comprises a video picture.

27. The method of solution 24, wherein the video region comprises a sequence of video pictures.

28. The method of solution 23, wherein the coding condition is signaled in the coded representation for the current video block.

29. The method of solution 23, wherein the coding condition is not explicitly signaled in the coded representation for the current video block.

30. The method of solution 28 or 29, wherein the rule specifies to select the cross-component prediction scheme based on a shape or a size of the current video block.

31. The method of any of solutions 28 or 29, wherein: the training samples are selected from:

neighboring samples above the luma block and wherein the set of samples of the luma block corresponds to a lower left pixel of the luma block;

neighboring samples above and to above-right of the luma block and wherein the set of samples of the luma block corresponds to a lower left pixel of the luma block;

neighboring samples above the luma block and wherein the set of samples of the luma block corresponds to a lower right pixel of the luma block;

neighboring samples above and above-right of the luma block and wherein the set of samples of the luma block corresponds to a lower right pixel of the luma block;

neighboring samples to left of the luma block and wherein the set of samples of the luma block corresponds to an upper right pixel of the luma block;

neighboring samples above the luma block and wherein the set of samples of the luma block corresponds to a lower left pixel of the luma block;

neighboring samples to left and left-bottom of the luma block and wherein the set of samples of the luma block corresponds to a lower right pixel of the luma block;

training samples corresponds to neighboring samples above to left of the luma block and wherein the set of samples of the luma block corresponds to a lower right pixel of the luma block; or neighboring samples above, left, above-right and left-bottom of the luma block and wherein the set of samples of the luma block corresponds to a lower right pixel of the luma block; and/or wherein the first chroma block is determined by applying a 2-tap filter to a first sample and a second sample in the set of samples of the luma block at a position corresponding to a position of the first chroma block; wherein the first sample is a lower left sample and the second sample is a lower right sample and wherein the training samples correspond to above neighboring samples; wherein the first sample is a lower left sample and the second sample is a lower right sample and wherein the training samples correspond to above and above-right neighboring samples; wherein the first sample is an upper right sample and the second sample is a lower right sample and wherein the training samples correspond to left neighboring samples; or wherein the first sample is an upper right sample and the second sample is a lower right sample and wherein the training samples correspond to left and left-bottom neighboring samples.

32. The method of solution 30, wherein the current video block has a width W pixels and a height H pixels, and wherein the rule specifies disabling the cross-component prediction scheme due to W<=T1 and H<=T2, where T1 and T2 are integers.

33. The method of solution 30, wherein the current video block has a width W pixels and a height H pixels, and wherein the rule specifies disabling the cross-component prediction scheme due to W*H<=T1.

34. The method of solution 30, wherein the current video block has a width W pixels and a height H pixels, and wherein the rule specifies selecting a specific cross-component prediction scheme due to W<=T1 and H<=T2, where T1 and T2 are integers, and wherein the specific cross-component prediction scheme is signaled in the coded representation.

35. The method of solution 30, wherein the current video block has a width W pixels and a height H pixels, and wherein the rule specifies selecting a specific cross-component prediction scheme due to W<=T1 and H<=T2, where T1 and T2 are integers, and wherein the specific cross-component prediction scheme is not signaled in the coded representation.

36. The method of solution 32, wherein the current video block has a width W pixels and a height H pixels, and wherein the rule specifies selecting a specific cross-component prediction scheme due to W*H<=T1, and wherein the specific cross-component prediction scheme is signaled in the coded representation.

37. The method of solution 32, wherein the current video block has a width W pixels and a height of H pixels, and wherein the rule specifies selecting a specific cross-component prediction scheme due to W>N*H, and wherein the specific cross-component prediction scheme is not signaled in the code representation, where N is an integer.

38. The method of solution 32, wherein the current video block has a width W pixels and a height of H pixels, and wherein the rule specifies selecting a specific cross-component prediction scheme due to W>N*H, and wherein the specific cross-component prediction scheme uses only pixels from above or above-right neighboring samples, and wherein the specific cross-component prediction scheme is signaled in the coded representation.

39. The method of solution 32, wherein the current video block has a width W pixels and a height of H pixels, and wherein the rule specifies selecting a specific cross-component prediction scheme due to N*W<H, and wherein the specific cross-component prediction scheme is signaled in the code representation, where N is an integer.

40. The method of solution 32, wherein the current video block has a width W pixels and a height of H pixels, and wherein the rule specifies selecting a specific cross-component prediction scheme due to W>N*H, and wherein the specific cross-component prediction scheme uses only pixels from left or left-bottom neighboring samples.

41. The method of any of solutions 34 to 40, wherein T1=2.

42. The method of any of solutions 10 to 17, wherein T2=2.

43. The method of any of solutions 10 to 17, wherein T1=4.

44. The method of any of solutions 10 to 17, wherein T2=4.

45. The method of any of solutions 10 to 17, wherein T2=16.

The previous section provides additional features of the above solutions (e.g., item 3).

Figure 17:
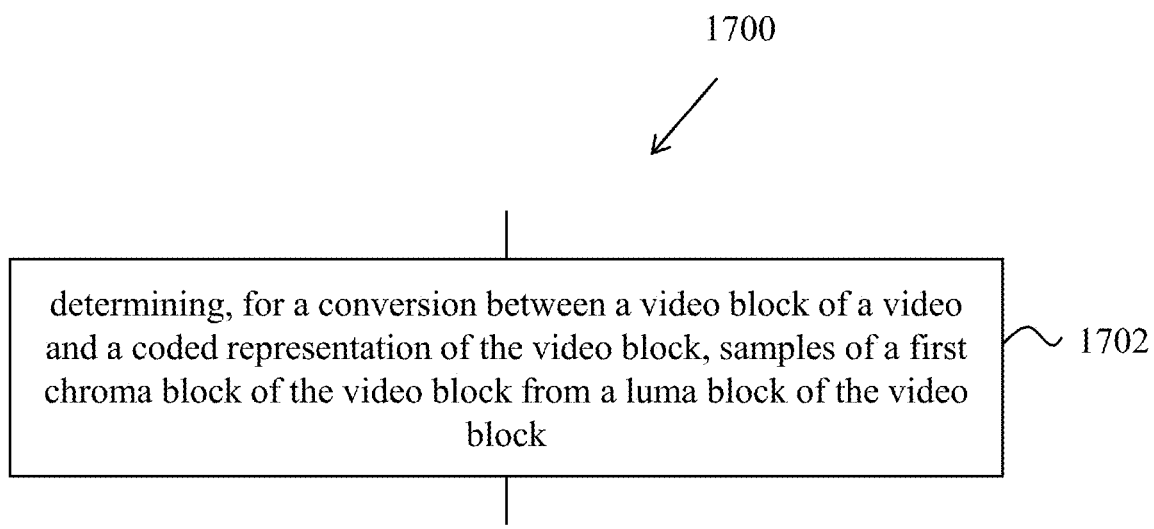

46. A method of video processing (e.g., method 1700 depicted in FIG. 17), comprising: determining (1702), for a conversion between a video block of a video and a coded representation of the video block, samples of a first chroma block of the video block from a luma block of the video block; wherein the samples of the first chroma block correspond to a weighted combination of a first intermediate chroma block and N second intermediate chroma blocks, wherein the first intermediate chroma block is generated from a first set of samples of the luma block using a first cross-component linear model, wherein the first cross-component linear model is generated using a first training sequence of luma samples; and wherein the N second intermediate chroma blocks are generated from N second sets of samples of the luma block using N second cross-component linear models, wherein the N second cross-component linear models are generated using N second training sequences of luma samples, where N is an integer.

47. The method of solution 46, wherein at least some of the first cross-component linear model and N second cross-component linear models are different from each other within a region of the video, where the region of video corresponds to a slice or a picture or a video sequence.

48. The method of any of solutions 46-47, wherein a coded representation includes an identification of the first cross-component linear model and the N second cross-component linear models.

49. The method of solution 47, wherein the identification is included in a sequence parameter set level or a picture parameter set level or a slice header or a group of coding tree unit or a coding tree unit or a coding unit level.

50. The method of any of solutions 46-49, wherein coded representation includes an indication of the first cross-component linear model and/or the N second cross-component linear models based on a rule that depends on a width W of the video block or a height H of the video block.

51. The method of solution 50, wherein the indication is included at a sequence parameter set level or a picture parameter set level or a slice header level or a groups of coding tree units level or a coding tree unit level or a at a coding block level.

The previous section provides additional features of the above solutions (e.g., item 4).

52. The method of any of solutions 1-51 wherein the method is selectively applied to the current video block based on an applicability rule related to the current video block satisfying a position condition within a current picture.

53. The method of solution 52, wherein the applicability rule specifies to apply a method of above solutions due to the video block being located at a top boundary of a coding tree unit.

54. The method of solution 52 or 53, wherein the applicability rule specifies to apply a method of above solutions due to the current video block being located at a left boundary of a coding tree unit.

The previous section provides additional features of the above solutions (e.g., item 5).

55. A method of any of solutions 1-54, wherein the set of samples of the luma block is generated using a downsampling process wherein a first downsampling filter is used for downsampling luma samples inside the video block and a second downsampling filter is applied to luma samples outside the video block to generate the set of samples of the luma block.

56. The method of solution 55, wherein the first downsampling filter corresponds to a legacy filter used by the Joint Exploration Model (JEM).

57. The method of any of solutions 55-56, wherein the second downsampling filter downsamples luma samples above the video block to lower left and lower right positions.

58. The method of solution 55, wherein luma samples above adjacent to the video block are denoted as a[i], then d[i]=(a[2i−1]+2*a[2i]+a[2i+1]+2)>>2, where d[i] represents the down-sampled luma samples, where i is a variable representing horizontal sample offset.

59. The method of solution 58, wherein, if the sample a[2i−1] is unavailable, the d[i] is determined as d[i]=(3*a[2i]+a[2i+1]+2)>>2.

60. The method of solution 58, wherein if the sample a[2i+1] is unavailable, then d[i]=(a[2i−1]+3*a[2i]+2)>>2.

61. The method of any of solutions 55-56, wherein the second downsampling filter downsamples luma samples to outside left to top right and bottom right positions.

62. The method of any of solutions 55-56, wherein the second downsampling filter downsamples luma samples to outside left to midway between top right and bottom right positions such that if left adjacent samples to the current block are denoted as a[j], then d[j]=(a[2j]+a[2j+1]+1)>>1, where d[j] represents down-sampled luma samples.

The previous section provides additional features of the above solutions (e.g., item 5).

Figure 18:
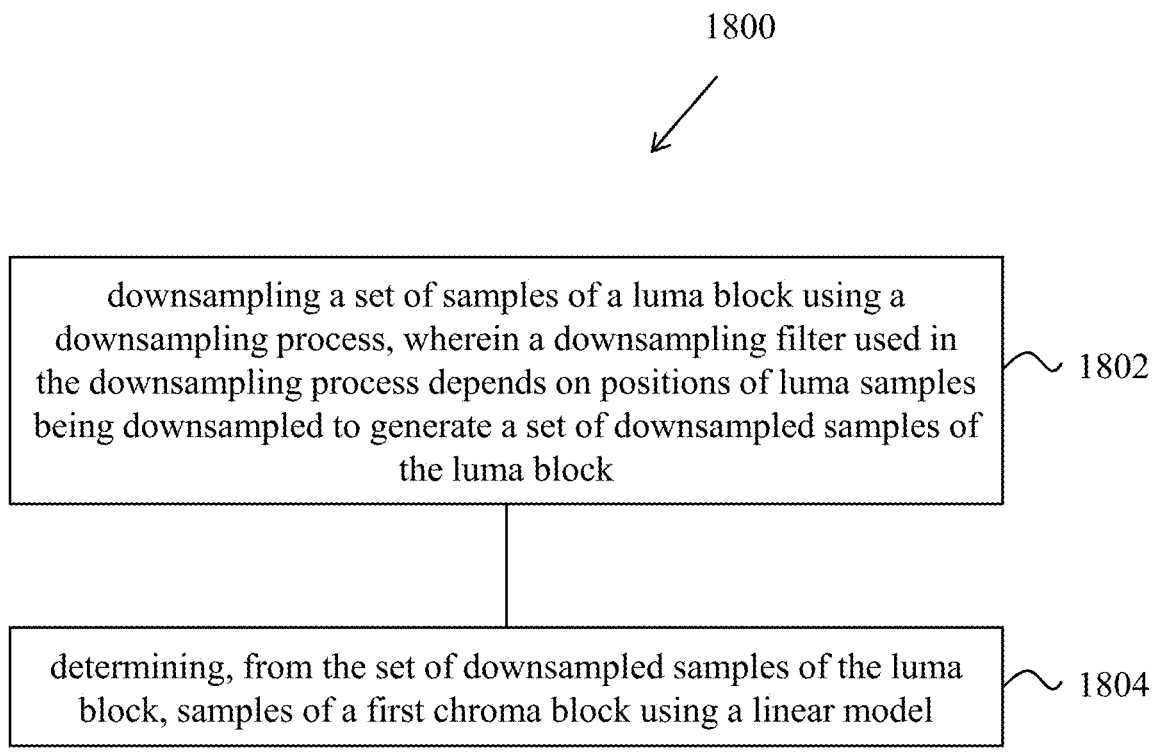

63. A method of video processing (e.g., method 1800 depicted in FIG. 18), comprising: downsampling (1802) a set of samples of a luma block using a downsampling process, wherein a downsampling filter used in the downsampling process depends on positions of luma samples being downsampled to generate a set of downsampled samples of the luma block; determining (1804), from the set of downsampled samples of the luma block, samples of a first chroma block using a linear model.

64. The method of solution 63, wherein the linear model is defined by a first parameter alpha and a second parameter beta and wherein a chroma sample predc(i, j) at a position (i, j) is determined from a luma sample recL(i, j) as $$predc(i,j)=alpha*recL(i,j)+beta.$$

The previous section provides additional features of the above solutions (e.g., item 7).

65. The method of any of solutions 63-64, further including applying a boundary filter the samples of the first chroma block that are a region of the current video block.

66. The method of solution 65, wherein samples above adjacent to the video block are denoted as a[−1][j], samples in the ith row and jth column of the first chroma block is a[i][j], then the applying the boundary filter is performed selectively based on a value if i, and comprises calculating a'[i][j]=(w1*a[i][j]+w2*a[−1][i]+2N−1)>>N, where w1+w2=2N represent weights.

67. The method of solution 66 wherein the applying the boundary filtering is performed only for i<=K.

68. The method of solution 66, wherein w1 and w2 are a function of row index i.

69. The method of solution 65, wherein left-adjacent samples to the video block are denoted as a[i[[−1], samples in the ith row and jth column of the first chroma block is a[i][j], then the applying the boundary filter is performed selectively based on a value if j, and comprises calculating a'[i][j]=(w1*a[i][j]+w2*a[i][−1]+2N−1)>>N, where w1+w2=2N.

70. The method of solution 69, wherein the applying the boundary filtering is performed only for j<=K.

71. The method of solution 70, wherein w1 and w2 are a function of column index j.

72. The method of solution 67 or 70, wherein K=0, w1=w2=1.

73. The method of solution 67 or 70, wherein K=0, w1=3, w2=1.

The previous section provides additional features of the above solutions (e.g., item 8).

74. An apparatus in a video system comprising a processor and a non-transitory memory with instructions thereon, wherein the instructions upon execution by the processor, cause the processor to implement the method in any one of solutions 1 to 85.

75. A computer program product stored on a non-transitory computer readable media, the computer program product including program code for carrying out the method in any one of solutions 1 to 85.

76. A video decoding apparatus comprising a processor configured to implement a method recited in one or more of solutions 1 to 85.

77. A video encoding apparatus comprising a processor configured to implement a method recited in one or more of solutions 1 to 85.

78. A method, apparatus or system described in the present document.

4 Example Implementations of the Disclosed Technology

Figure 13:
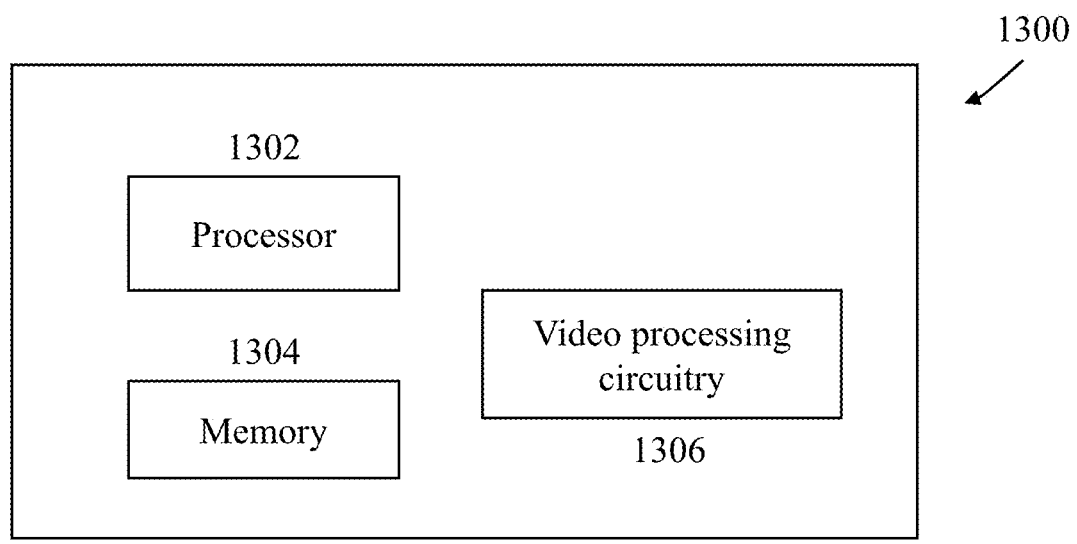
FIG. 13 is a block diagram of an example of a hardware platform for implementing a visual media decoding or a visual media encoding technique described in the present document.

FIG. 13 is a block diagram of a video processing apparatus 1300. The apparatus 1300 may be used to implement one or more of the methods described herein. The apparatus 1300 may be embodied in a smartphone, tablet, computer, Internet of Things (IoT) receiver, and so on. The apparatus 1300 may include one or more processors 1302, one or more memories 1304 and video processing hardware 1306. The processor(s) 1302 may be configured to implement one or more methods (including, but not limited to, methods 900, 1000, . . . to 1800) described in the present document. The memory (memories) 1304 may be used for storing data and code used for implementing the methods and techniques described herein. The video processing hardware 1306 may be used to implement, in hardware circuitry, some techniques described in the present document.

In some embodiments, the video coding methods may be implemented using an apparatus that is implemented on a hardware platform as described with respect to FIG. 13.

Figure 20:
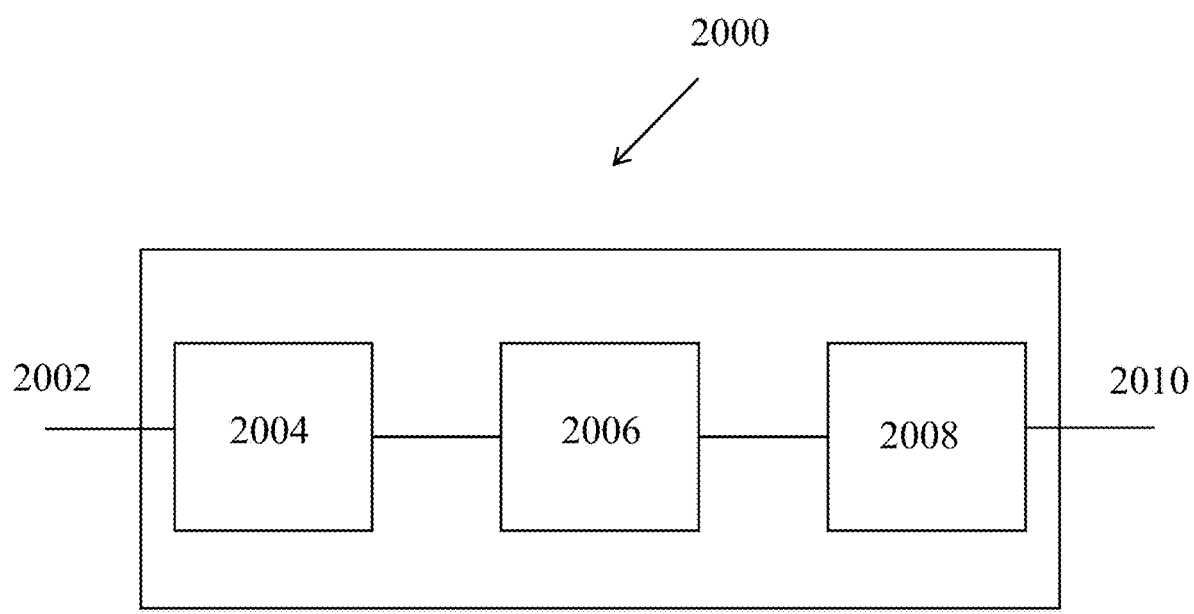
FIG. 20 is a block diagram of an example video processing system in which disclosed techniques may be implemented.

FIG. 20 is a block diagram showing an example video processing system 2000 in which various techniques disclosed herein may be implemented. Various implementations may include some or all of the components of the system 2000. The system 2000 may include input 2002 for receiving video content. The video content may be received in a raw or uncompressed format, e.g., 8 or 10 bit multi-component pixel values, or may be in a compressed or encoded format. The input 2002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2000 may include a coding component 2004 that may implement the various coding or encoding methods described in the present document. The coding component 2004 may reduce the average bitrate of video from the input 2002 to the output of the coding component 2004 to produce a coded representation of the video. The coding techniques are therefore sometimes called video compression or video transcoding techniques. The output of the coding component 2004 may be either stored, or transmitted via a communication connected, as represented by the component 2006. The stored or communicated bitstream (or coded) representation of the video received at the input 2002 may be used by the component 2008 for generating pixel values or displayable video that is sent to a display interface 2010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Examples of Simulation Results

The various CCLM methods were implemented on VTM-2.0.1. For testing effectiveness of the proposed methods, two solutions were tested.

The two solutions differed in usage of different sets of neighboring luma samples. Suppose the width and height of one block is denoted as W and H, respectively. In solution #1, W above neighboring samples and H left neighboring samples were involved in the training process for deriving alpha and beta parameters In solution #2, 2 W above neighboring samples and 2H left neighboring samples were used for training.

Test #1 and test #2 are conducted for solution #1 and solution #2, respectively. Simulation results of All Intra (AI) and Random Access (RA) configuration for Test 1 and Test 2 are summarized in Table 1 and Table 2, respectively.

TABLE 1

Results for Test 1

| | AI | | | | | RA | | | | |
|---|---|---|---|---|---|---|---|---|---|---|
| | Y | U | V | EncT | DecT | Y | U | V | EncT | DecT |
| Class A1 | 0.23% | 2.11% | 1.56% | 100% | 102% | 0.13% | 1.46% | 1.17% | 99% | 99% |
| Class A2 | 0.11% | 0.45% | 0.29% | 100% | 99% | 0.05% | 0.55% | 0.23% | 99% | 98% |
| Class B | 0.05% | 0.49% | 0.91% | 100% | 99% | 0.05% | 0.66% | 1.04% | 99% | 101% |
| Class C | 0.18% | 1.10% | 1.34% | 99% | 98% | 0.09% | 1.00% | 1.09% | 100% | 106% |
| Class E | −0.01% | 0.15% | 0.06% | 101% | 105% | | | | | |
| Overall | 0.11% | 0.83% | 0.87% | 100% | 100% | 0.08% | 0.89% | 0.92% | 99% | 101% |

TABLE 2

Results of Test 2

| | AI | | | | | RA | | | | |
|---|---|---|---|---|---|---|---|---|---|---|
| | Y | U | V | EncT | DecT | Y | U | V | EncT | DecT |
| Class A1 | 0.14% | 1.37% | 0.96% | 101% | 100% | 0.08% | 0.82% | 0.57% | 101% | 97% |
| Class A2 | 0.07% | 0.01% | 0.04% | 100% | 100% | 0.02% | 0.13% | 0.16% | 100% | 95% |
| Class B | 0.03% | 0.16% | 0.38% | 100% | 100% | 0.01% | 0.08% | 0.43% | 101% | 98% |
| Class C | 0.18% | 0.70% | 1.01% | 99% | 98% | 0.04% | 0.69% | 0.74% | 102% | 107% |
| Class E | −0.01% | −0.26% | −0.35% | 102% | 101% | | | | | |
| Overall | 0.08% | 0.39% | 0.44% | 100% | 99% | 0.03% | 0.40% | 0.49% | 101% | 99% |

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of coding video data, comprising:
   determining, for a conversion between a current video block of a video that is a chroma block and a bitstream of the video, a corresponding luma block for the current video block, wherein a color format for the current video block and the corresponding luma block is 4:2:0, and a cross component linear mode is applied for the current video block;
   generating down-sampled inside luma samples of the corresponding luma block;
   generating down-sampled above neighboring luma samples of the corresponding luma block, wherein different down-sampled filtering schemes are used to generate the down-sampled above neighboring luma samples based on a position of the corresponding luma block;
   deriving parameters of the cross-component linear model at least based on the down-sampled above neighboring luma samples;

generating predicted chroma samples of the current video block based on the parameters of the cross-component linear model and the down-sampled inside luma samples; and performing the conversion based on the predicted chroma samples, wherein in response to the position of the corresponding luma block meeting a first position rule, a first down-sampled filtering scheme is used to generate the down-sampled above neighboring luma samples, wherein the first position rule is that a top boundary of the corresponding luma block is overlapping with a top boundary of a current luma coding tree block (CTB) including the corresponding luma block, and wherein the cross component linear mode includes multiple types, and which type of the multiple types is applied is indicated by a flag in the bitstream, and in all of the multiple types, the maximum difference between positions of the down-sampled above neighboring luma samples and a position of the top-left sample of the corresponding luma block is no more than 4*W, where W indicates a width of the current video block.

2. The method of claim 1, wherein only one above luma sample row is used to generate the down-sampled above neighboring luma samples in the first down-sampled filtering scheme.

3. The method of claim 2, wherein the only one above luma sample row is adjacent to the corresponding luma block.

4. The method of claim 1, wherein in response to the position of the corresponding luma block not meeting a first position rule, a second down-sampled filtering scheme is used to generate the down-sampled above neighboring luma samples, wherein the first position rule is that a top boundary of the corresponding luma block is overlapping with a top boundary of a current luma coding tree block (CTB) including the corresponding luma block.

5. The method of claim 4, wherein multiple above luma sample rows are used to generate the down-sampled above neighboring luma samples in the second down-sampled filtering scheme.

6. The method of claim 5, wherein at least one of multiple above luma sample rows is not adjacent to the corresponding block.

7. The method of claim 4, further comprising:
applying a third down-sampled filtering scheme to generate the down-sampled inside luma samples of the corresponding luma block, wherein the third down-sampled filtering scheme uses same filtering taps and filtering coefficients with the second down-sampled filtering scheme.

8. The method of claim 1, wherein the conversion includes encoding the current video block into the bitstream.

9. The method of claim 1, wherein the conversion includes decoding the current video block from the bitstream.

10. An apparatus for processing video data comprising a processor and a non-transitory memory with instructions thereon, wherein the instructions upon execution by the processor, cause the processor to:
determine, for a conversion between a current video block of a video that is a chroma block and a bitstream of the video, a corresponding luma block for the current video block, wherein a color format for the current video block and the corresponding luma block is 4:2:0, and a cross component linear mode is applied for the current video block;

generate down-sampled inside luma samples of the corresponding luma block;

generate down-sampled above neighboring luma samples of the corresponding luma block, wherein different down-sampled filtering schemes are used to generate the down-sampled above neighboring luma samples based on a position of the corresponding luma block;

derive parameters of the cross-component linear model at least based on the down-sampled above neighboring luma samples;

generate predicted chroma samples of the current video block based on the parameters of the cross-component linear model and the down-sampled inside luma samples; and perform the conversion based on the predicted chroma samples, wherein in response to the position of the corresponding luma block meeting a first position rule, a first down-sampled filtering scheme is used to generate the down-sampled above neighboring luma samples, wherein the first position rule is that a top boundary of the corresponding luma block is overlapping with a top boundary of a current luma coding tree block (CTB) including the corresponding luma block, and wherein the cross component linear mode includes multiple types, and which type of the multiple types is applied is indicated by a flag in the bitstream, and in all of the multiple types, the maximum difference between positions of the down-sampled above neighboring luma samples and a position of the top-left sample of the corresponding luma block is no more than 4*W, where W indicates a width of the current video block.

11. The apparatus of claim 10, wherein only one above luma sample row is used to generate the down-sampled above neighboring luma samples in the first down-sampled filtering scheme.

12. The apparatus of claim 11, wherein the only one above luma sample row is adjacent to the corresponding luma block.

13. The apparatus of claim 10, wherein in response to the position of the corresponding luma block not meeting a first position rule, a second down-sampled filtering scheme is used to generate the down-sampled above neighboring luma samples, wherein the first position rule is that a top boundary of the corresponding luma block is overlapping with a top boundary of a current luma coding tree block (CTB) including the corresponding luma block.

14. The apparatus of claim 13, wherein multiple above luma sample rows are used to generate the down-sampled above neighboring luma samples in the second down-sampled filtering scheme.

15. The apparatus of claim 14, wherein at least one of multiple above luma sample rows is not adjacent to the corresponding block.

16. The apparatus of claim 13, further comprising:
apply a third down-sampled filtering scheme to generate the down-sampled inside luma samples of the corresponding luma block, wherein the third down-sampled filtering scheme uses same filtering taps and filtering coefficients with the second down-sampled filtering scheme.

17. A non-transitory computer-readable storage medium storing instructions that cause a processor to:
determine, for a conversion between a current video block of a video that is a chroma block and a bitstream of the video, a corresponding luma block for the current video block, wherein a color format for the current video block and the corresponding luma block is 4:2:0, and a cross component linear mode is applied for the current video block;

generate down-sampled inside luma samples of the corresponding luma block;

generate down-sampled above neighboring luma samples of the corresponding luma block, wherein different down-sampled filtering schemes are used to generate the down-sampled above neighboring luma samples based on a position of the corresponding luma block;

derive parameters of the cross-component linear model at least based on the down-sampled above neighboring luma samples;

generate predicted chroma samples of the current video block based on the parameters of the cross-component linear model and the down-sampled inside luma samples; and perform the conversion based on the predicted chroma samples, wherein in response to the position of the corresponding luma block meeting a first position rule, a first down-sampled filtering scheme is used to generate the down-sampled above neighboring luma samples, wherein the first position rule is that a top boundary of the corresponding luma block is overlapping with a top boundary of a current luma coding tree block (CTB) including the corresponding luma block, and wherein the cross component linear mode includes multiple types, and which type of the multiple types is applied is indicated by a flag in the bitstream, and in all of the multiple types, the maximum difference between positions of the down-sampled above neighboring luma samples and a position of the top-left sample of the corresponding luma block is no more than 4*W, where W indicates a width of the current video block.

18. A non-transitory computer-readable recording medium storing a bitstream which is generated by a method performed by a video processing apparatus, wherein the method comprises:

determining, for a current video block of a video that is a chroma block, a corresponding luma block for the current video block, wherein a color format for the current video block and the corresponding luma block is 4:2:0, and a cross component linear mode is applied for the current video block;

generating down-sampled inside luma samples of the corresponding luma block;

generating down-sampled above neighboring luma samples of the corresponding luma block, wherein different down-sampled filtering schemes are used to generate the down-sampled above neighboring luma samples based on a position of the corresponding luma block;

deriving parameters of the cross-component linear model at least based on the down-sampled above neighboring luma samples;

generating predicted chroma samples of the current video block based on the parameters of the cross-component linear model and the down-sampled inside luma samples; and generating the bitstream based on the predicted chroma samples, wherein in response to the position of the corresponding luma block meeting a first position rule, a first down-sampled filtering scheme is used to generate the down-sampled above neighboring luma samples, wherein the first position rule is that a top boundary of the corresponding luma block is overlapping with a top boundary of a current luma coding tree block SCTB) including the corresponding luma block, and wherein the cross component linear mode includes multiple types, and which type of the multiple types is applied is indicated by a flag in the bitstream, and in all of the multiple types, the maximum difference between positions of the down-sampled above neighboring luma samples and a position of the top-left sample of the corresponding luma block is no more than 4*W, where W indicates a width of the current video block.

\* \* \* \* \*